US011023771B2

(12) United States Patent
Irie

(10) Patent No.: US 11,023,771 B2
(45) Date of Patent: Jun. 1, 2021

(54) INFORMATION PROCESSING APPARATUS, INFORMATION PROCESSING METHOD, AND RECORDING MEDIUM

(71) Applicant: SONY CORPORATION, Tokyo (JP)

(72) Inventor: Atsushi Irie, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 5 days.

(21) Appl. No.: 16/466,164

(22) PCT Filed: Nov. 16, 2017

(86) PCT No.: PCT/JP2017/041222
§ 371 (c)(1),
(2) Date: Jun. 3, 2019

(87) PCT Pub. No.: WO2018/146890
PCT Pub. Date: Jun. 16, 2018

(65) Prior Publication Data
US 2020/0065610 A1 Feb. 27, 2020

(30) Foreign Application Priority Data

Feb. 9, 2017 (JP) .............................. JP2017-021844

(51) Int. Cl.
G06K 9/00 (2006.01)
G06K 9/46 (2006.01)
G06T 7/194 (2017.01)
G06K 9/20 (2006.01)

(52) U.S. Cl.
CPC ......... *G06K 9/4661* (2013.01); *G06K 9/2054* (2013.01); *G06T 7/194* (2017.01); *G06K 2209/21* (2013.01)

(58) Field of Classification Search
CPC .............. G06K 9/4661; G06K 9/2054; G06K 2209/21; G06T 7/194
See application file for complete search history.

(56) References Cited

U.S. PATENT DOCUMENTS

| 7,936,944 B2* | 5/2011 | Sato | H04N 5/232 382/274 |
|---|---|---|---|
| 2009/0141027 A1* | 6/2009 | Sato | G06K 9/2036 345/426 |
| 2016/0267348 A1* | 9/2016 | Kondo | G06K 9/4671 |

FOREIGN PATENT DOCUMENTS

| CN | 105814607 A | 7/2016 |
|---|---|---|
| EP | 3086282 A1 | 10/2016 |
| JP | 11-312241 A | 11/1999 |
| JP | 2004-282167 A | 10/2004 |

(Continued)

OTHER PUBLICATIONS

International Search Report and Written Opinion of PCT Application No. PCT/JP2017/041222, dated Feb. 6, 2018, 9 pages of ISRWO.

(Continued)

*Primary Examiner* — Khai M Nguyen
(74) *Attorney, Agent, or Firm* — Chip Law Group

(57) ABSTRACT

An information processing apparatus including one or more processors that calculate a degree of polarization on the basis of polarization information in each of multiple directions, which is detected from a target region including a region through which polarized light passes, and extract a region in which an object is present on the basis of the degree of polarization.

18 Claims, 16 Drawing Sheets

(56) References Cited

FOREIGN PATENT DOCUMENTS

| | | |
|---|---|---|
| JP | 2006-112802 A | 4/2006 |
| JP | 2008-020588 A | 1/2008 |
| JP | 2015-115041 A | 6/2015 |

OTHER PUBLICATIONS

Nishikawa, et al., "A Tabletop System utilizing polarization", WISS, 2007, 4 pages Original Document and 12 pages of English Translation.

* cited by examiner

INFORMATION PROCESSING APPARATUS, INFORMATION PROCESSING METHOD, AND RECORDING MEDIUM

CROSS REFERENCE TO RELATED APPLICATIONS

This application is a U.S. National Phase of International Patent Application No. PCT/JP2017/041222 filed on Nov. 16, 2017, which claims priority benefit of Japanese Patent Application No. JP 2017-021844 filed in the Japan Patent Office on Feb. 9, 2017. Each of the above-referenced applications is hereby incorporated herein by reference in its entirety.

TECHNICAL FIELD

The present disclosure relates to an information processing apparatus, an information processing method, and a recording medium.

BACKGROUND ART

In recent years, a technology of extracting a region in which an object is present by using polarization information is known. For example, the technology of determining the quality of a material on the basis of the polarization information and extracting the region in which the object is present on the basis of the determined quality of the material has been disclosed (e.g., see Patent Literature 1). Further, the technology of arranging two polarization plates such that polarization directions are perpendicular to each other and extracting a region through which light is transmitted as the region in which the object is present has been disclosed (e.g., see Patent Literatures 2 and 3 and Non-Patent Literature 1).

CITATION LIST

Patent Literature

Patent Literature 1: Japanese Patent Application Laid-open No. 2015-115041
Patent Literature 2: Japanese Patent Application Laid-open No. 2006-112802
Patent Literature 3: Japanese Patent Application Laid-open No. 2008-20588

Non-Patent Literature

Non-Patent Literature 1: Nishikawa, et al., "A Tabletop System utilizing polarization", WISS2007

DISCLOSURE OF INVENTION

Technical Problem

However, it is desirable to provide a technology by which a region in which an object is present can be accurately extracted with a simpler configuration.

Solution to Problem

In accordance with the present disclosure, there is provided an information processing apparatus including one or more processors that calculate a degree of polarization on the basis of polarization information in each of multiple directions, which is detected from a target region including a region through which polarized light passes, and extract a region in which an object is present on the basis of the degree of polarization.

In accordance with the present disclosure, there is provided an information processing method, including: calculating a degree of polarization on the basis of polarization information in each of multiple directions, which is detected from a target region including a region through which polarized light passes; and extracting, by one or more processors, a region in which an object is present on the basis of the degree of polarization.

In accordance with the present disclosure, there is provided a recording medium readable by a computer, which records a program for causing the computer to function as an information processing apparatus including one or more processors that calculate a degree of polarization on the basis of polarization information in each of multiple directions, which is detected from a target region including a region through which polarized light passes, and extract a region in which an object is present on the basis of the degree of polarization.

Advantageous Effects of Invention

As described above, in accordance with the present disclosure, a technology by which a region in which an object is present can be accurately extracted with a simpler configuration is provided. It should be noted that the above-mentioned effects are not necessarily limitative and any effect shown in the present specification or other effects which can be grasped from the present specification may be provided in addition to the above-mentioned effects or instead of the above-mentioned effects.

MODE(S) FOR CARRYING OUT THE INVENTION

Figure 1:
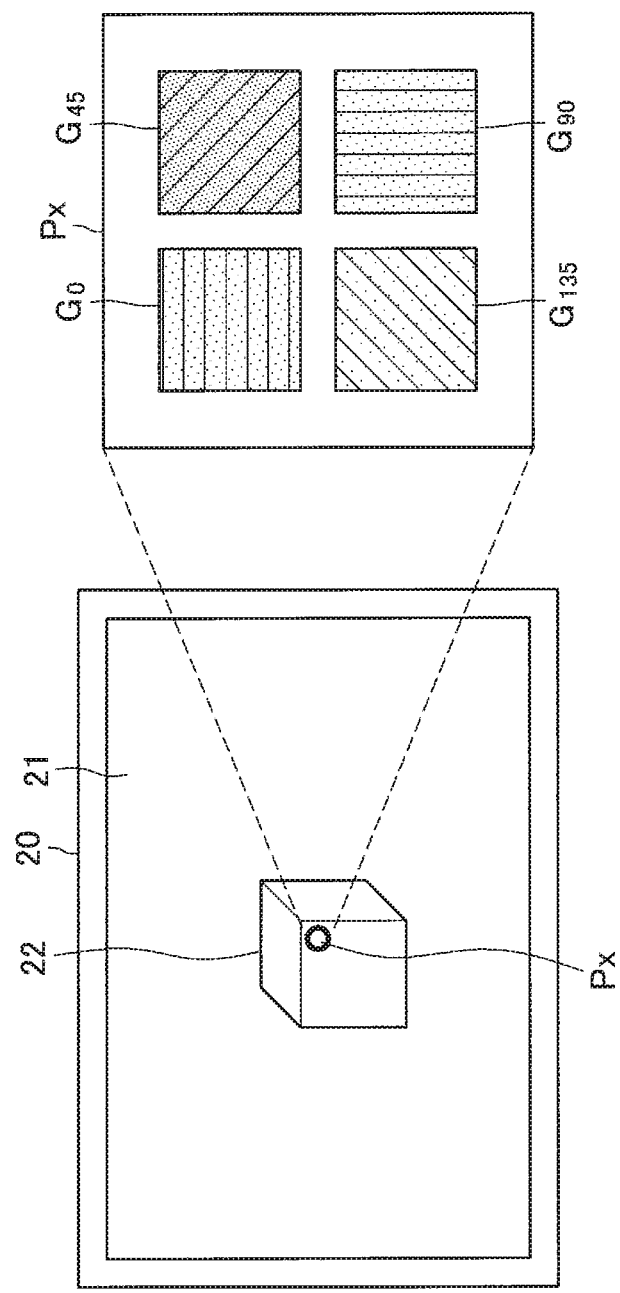
FIG. 1 A diagram for describing a case of detecting a region in which a polarization plate is absent by use of a polarization camera.

Hereinafter, favorable embodiments of the present disclosure will be described in detail with reference to the accompanying drawings. It should be noted that in the present specification and the drawings, components having substantially identical functional configurations will be denoted by identical signs and duplicated descriptions will be thus omitted.

Further, in the present specification and the drawings, multiple components having substantially identical or similar functional configurations will be differentiated by adding different numericals after the identical signs in some cases. It should be noted that in a case where the respective multiple components having substantially identical or similar functional configurations needs to be differentiated, only identical signs will be added. Further, similar components in different embodiments will be differentiated by adding different alphabets after identical signs in some cases. It should be noted that in a case where respective similar components do not especially need to be differentiated, only identical signs will be added.

It should be noted that descriptions will be made in the following order.

0. Outline
1. First Embodiment
1.1. System Configuration Example
1.2. Functional Configuration Example of Information Processing Apparatus
1.3. Detailed Functions of Information Processing System
1.4. Operation Example of Information Processing System
1.5. Various Modified Examples
2. Second Embodiment
3. Third Embodiment
4. Hardware Configuration Example
5. Conclusion

0. Outline

First of all, the outline of an embodiment of the present disclosure will be described. In recent years, a technology of extracting a region in which an object is present by using polarization information is known. For example, a technology of determining the quality of a material on the basis of polarization information and extracting a region in which an object is present on the basis of the determined quality of the material has been disclosed. For example, the technology of extracting the region in which the object is present by using an image feature amount calculated on the basis of the polarization information has been disclosed (e.g., see Patent Literature 1 above). By using the polarization information, it becomes possible to determine a difference of the quality of a material and/or the material of an object and extract the region in which the object is present on the basis of a difference in the quality of the material and/or the material. It should be noted that in the present specification, the "quality of the material and/or the material" means the quality of the material, the material, or both of the quality of the material and the material.

However, in accordance with such a technology, it is difficult to grasp the quality of the material and/or the material due to noise or other external factors. For example, in a case where a region including much noise or many other external factors is present, that region can be considered as a region in which an object having irregularities is present. Further, in accordance with such a technology, in a case where another object or region similar to an object whose region extraction is wished to be performed in terms of the quality of the material and/or the material is present, the region in which the object is present cannot be accurately extracted in some cases. For example, in a case where a wall similar to the object whose region extraction is wished to be performed in terms of the quality of the material and/or the material is at a background, it is difficult to extract the region in which the object is present.

Further, a technology of arranging two polarization plates such that polarization directions are perpendicular to each other and extracting the region through which light is transmitted as the region in which the object is present has been disclosed.

As a first example, a technology of arranging two polarization filters in front of the camera and in front of a liquid crystal display (LCD) such that polarization directions are perpendicular to each other has been disclosed (e.g., see Non-Patent Literature 1 above). With this configuration, the region through which light is transmitted can be extracted as a region in which a hand is present. However, in accordance with such a technology, the two polarization filters are required, and in a case where two polarization filters are arranged such that the polarization directions (hereinafter, also referred to as "axes of the polarization plates") are not orthogonal to each other, the region through which light is not transmitted is absent. Therefore, there is a possibility that the region in which the hand is present is erroneously extracted.

As a second example, a technology of arranging a polarization plate and a polarization pattern (or two polarization patterns) such that polarization directions are perpendicular to each other has been disclosed (e.g., see Non-Patent Literature 2 above). With this configuration, it becomes possible to extract the region through which light is transmitted as the region in which the object is present. However, in accordance with such a technology, as in Non-Patent Literature 1 above, two polarization plates or polarization patterns are required, and in a case where the two polarization plates or polarization filters are arranged such that polarization directions are not orthogonal to each other, the region through which light is not transmitted is absent. Therefore, there is a possibility that the region in which the object is present is erroneously extracted.

As a third example, a technology of preparing two polarization plates having polarization directions perpendicular to each other, capturing an image in each of a state in which the two polarization plates are present and a state in which the two polarization plates are absent, and extracting a defective site of a crystal-liquid panel on the basis of a difference between the images obtained by image capturing has been disclosed (see Non-Patent Literature 3 above). However, in accordance with such a technology, as in Non-Patent Literature 1 above, the two polarization plates are required, and in a case where the two polarization plates are arranged such that the polarization directions are not orthogonal to each other, the region through which light is not transmitted is absent. Therefore, there is a possibility that the region in which the object is present is erroneously extracted. In addition, in accordance with such a technology, it is necessary to capture a plurality of images.

In view of this, in the present specification, a technology by which a region in which an object is present can be accurately extracted with a simpler configuration is mainly proposed. As an example, in the present specification, a technology by which the region in which the object is present can be extracted with a simpler configuration by using only one polarization plate will be proposed. Further, in the present specification, a technology by which the region in which the object is present can be accurately extracted by extracting the region in which the object is present irrespective of the quality of the material and/or the material even if another object or region similar to an object whose region extraction is wished to be performed in terms of the quality of the material and/or the material is present will be proposed.

Hereinabove, the outline of the embodiment of the present disclosure has been described.

1. First Embodiment 1.1. System Configuration Example

Next, a configuration example of the information processing system according to the first embodiment will be described with reference to the drawings. In the information processing system according to the first embodiment, a case of capturing a region in which the polarization plate is present by use of the polarization camera will be assumed. First of all, a case where the region in which the polarization plate is absent is captured by the polarization camera for a comparative description will be described.

FIG. 1 is a diagram for describing a case of detecting a region in which a polarization plate is absent by use of a polarization camera. As shown in FIG. 1, the display apparatus 20 including the display screen 21 is present. Further, the display object 22 is displayed on the display screen 21.

Hereinafter, a case where the display object 22 is selected in such a manner that the user touches the display object 22 will be assumed. However, other processing may be executed instead of selection of the display object 22. Further, although it is assumed that the display apparatus 20 is a tabletop display, the form of the display apparatus 20 is not limited to the tabletop type as will be described later.

In the present specification, a case where the polarization camera acquires polarization information in each of four directions will be mainly assumed. However, the number of directions in which the polarization information is acquired is not limited to four. For example, the directions in which the polarization information is acquired only need to be multiple. It may be two, may be three, or may be five or more. Further, in the present specification, a case where the x-axis (right direction of sheet) is set to a reference direction (angle formed by the x-axis is 0°) and a direction sequentially rotated by each constant angle is set to each of other three directions (angles formed by the x-axis is respectively 45°, 90°, and 135°) will be mainly described. However, a relationship between the multiple directions is not particularly limited.

Referring to FIG. 1, the polarization plate is not provided in front of the display screen 21. Therefore, in a case where the polarization camera captures the display screen 21, a target region to be detected by the polarization camera includes only a region through which light not particularly polarized passes. Therefore, it is considered that an excessively large difference is not caused between a maximum luminance and a minimum luminance of luminances respectively obtained from the four pieces of polarization information.

As an example, a case where one pixel Px included in the display object 22 is captured will be assumed. FIG. 1 shows polarization information $G_0$, $G_{45}$, $G_{90}$, and $G_{135}$ (additive letters denote angles formed by the x-axis) obtained when this pixel Px is captured. The color depth of the respective polarization information $G_0$, $G_{45}$, $G_{90}$, and $G_{135}$ denote luminances (denoting a higher luminance as it becomes brighter). Further, the lines drawn inside the respective polarization information $G_0$, $G_{45}$, $G_{90}$, and $G_{135}$ express directions in which the polarization information is acquired.

Referring to FIG. 1, the luminance obtained from the polarization information $G_{135}$ is maximum and the luminance obtained from the polarization information $G_{45}$ is minimum. However, it is understood that an excessively large difference is not caused between the luminance obtained from the polarization information $G_{135}$ (maximum luminance) and the luminance obtained from the polarization information $G_{45}$ (minimum luminance).

Figure 2:
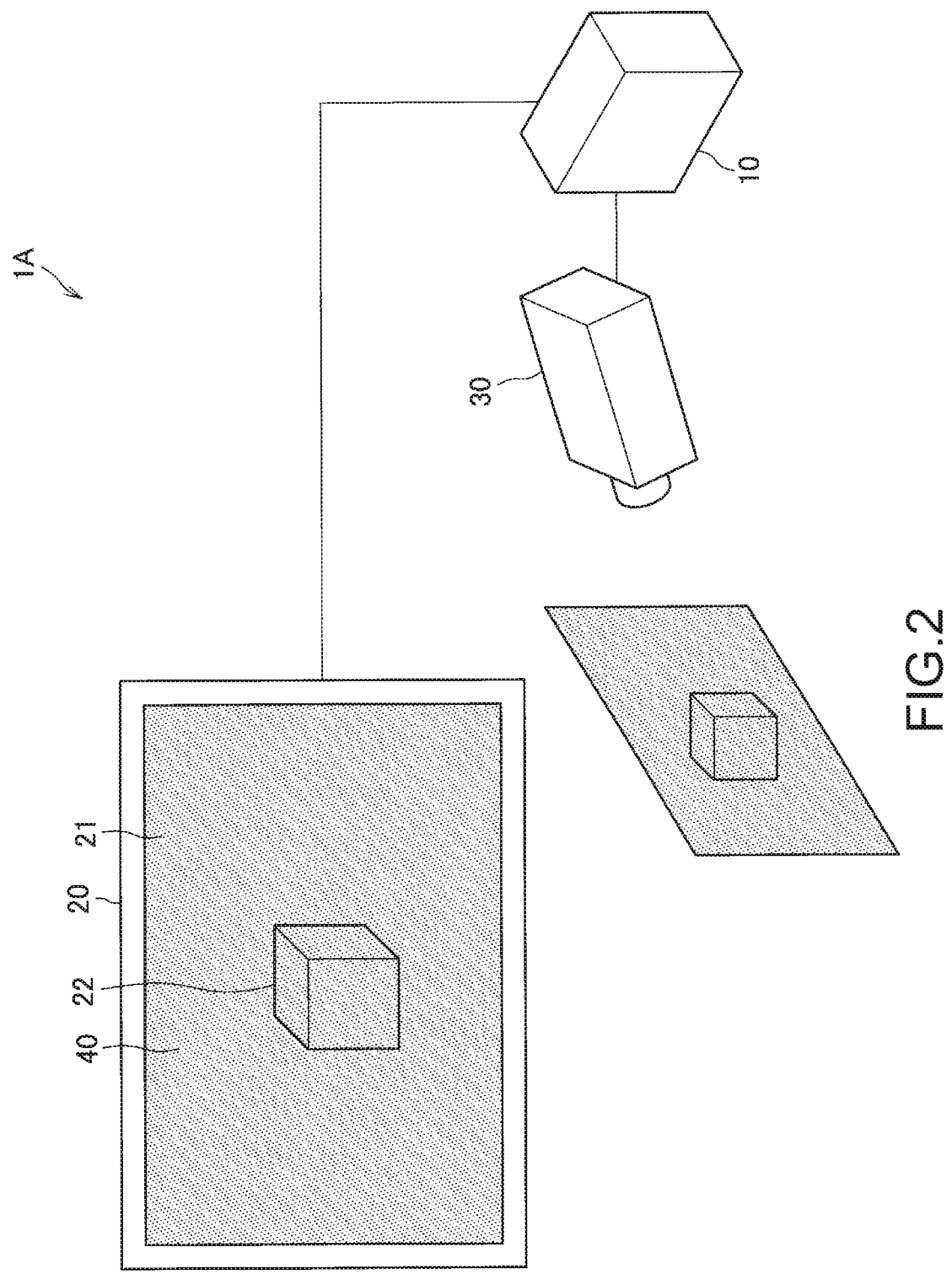
FIG. 2 A diagram showing a configuration example of an information processing system according to the embodiment.

FIG. 2 is a diagram showing a configuration example of the information processing system according to the first embodiment. As shown in FIG. 2, an information processing system 1A includes an information processing apparatus 10, a display apparatus 20, and a polarization camera 30. As in the example shown in FIG. 1, the display apparatus 20 includes a display screen 21 on which a display object 22 is displayed. On the other hand, the information processing system 1A includes a polarization plate 40 in front of the display screen 21 captured by the polarization camera 30.

Hereinabove, a configuration example of the information processing system 1A according to the first embodiment has been described.

1.2. Functional Configuration Example of Information Processing Apparatus

Figure 3:
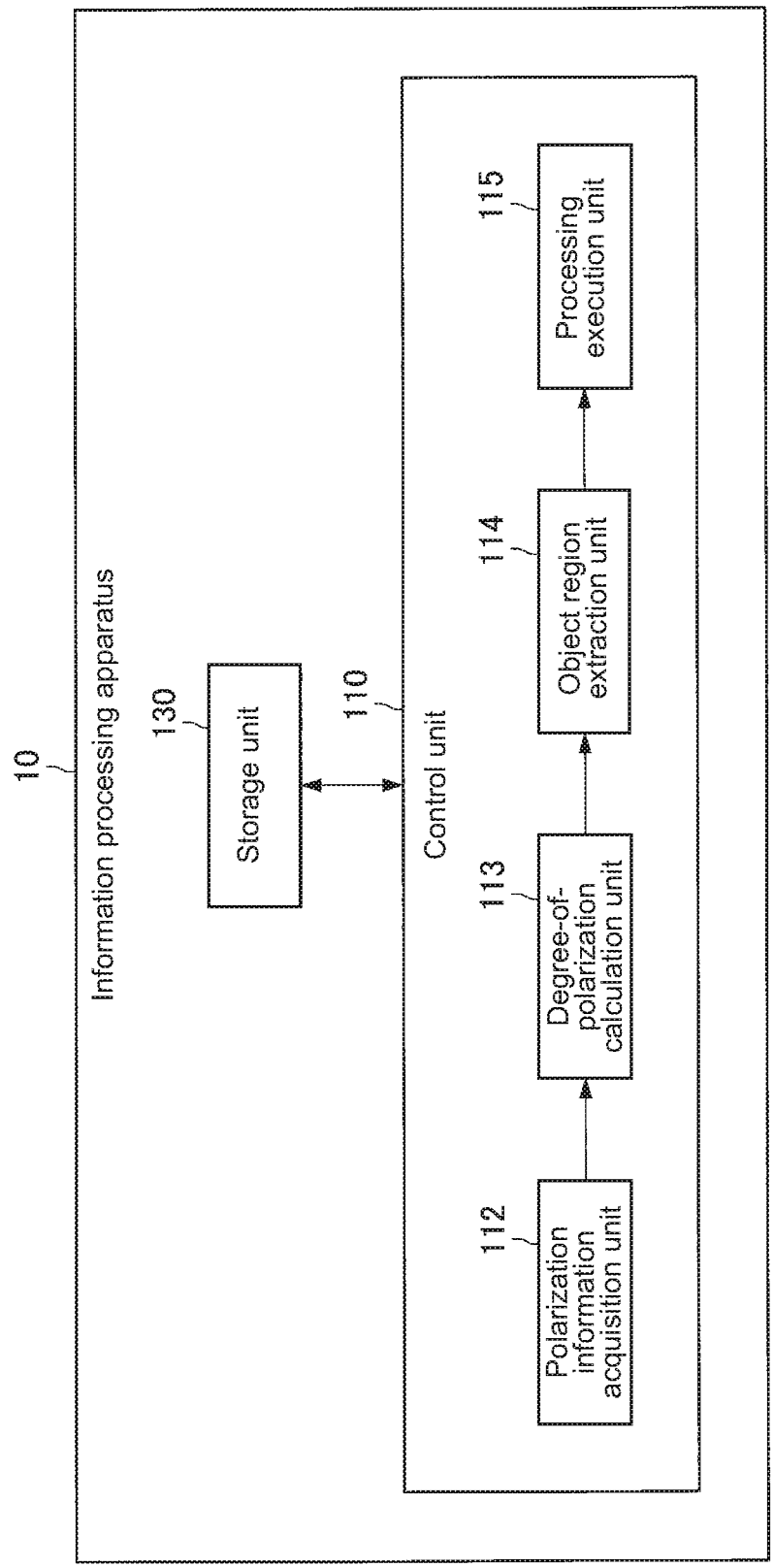
FIG. 3 A block diagram showing a functional configuration example of an information processing apparatus according to the embodiment.

Next, a functional configuration example of the information processing apparatus 10 according to the first embodiment will be described. FIG. 3 is a block diagram showing a functional configuration example of the information processing apparatus 10 according to the first embodiment. As shown in FIG. 3, the information processing apparatus 10 includes a control unit 110 and a storage unit 150. Hereinafter, those functional blocks of the information processing apparatus 10 will be described.

The control unit 110 executes control of the respective units of the information processing apparatus 10. It should be noted that the control unit 110 may include one or more processors, for example. The one or more processors may be a central processing unit (CPU; central arithmetic processing apparatus), may be a graphics processing unit (GPU), may be another processor, or may be combination of any two or more of them. In a case where the control unit 110 includes one or more processors, such processors may include an electronic circuit. As shown in FIG. 3, the control unit 110 includes a polarization information acquisition unit 112, a degree-of-polarization calculation unit 113, an object region extraction unit 114, and a processing execution unit 115. Those blocks of the control unit 110 will be described in detail later.

The storage unit 130 includes a memory and is a recording device that stores a program to be executed by the control unit 110 and stores data required for execution of the program. Further, the storage unit 130 temporarily stores data for computation by the control unit 110. It should be noted that the storage unit 130 may be a magnetic storage unit device, may be a semiconductor storage device, may be an optical storage device, or may be a magneto-optical storage device.

Hereinabove, a functional configuration example of the information processing apparatus 10 according to the first embodiment has been described.

1.3. Detailed Functions of Information Processing System

Figure 4:
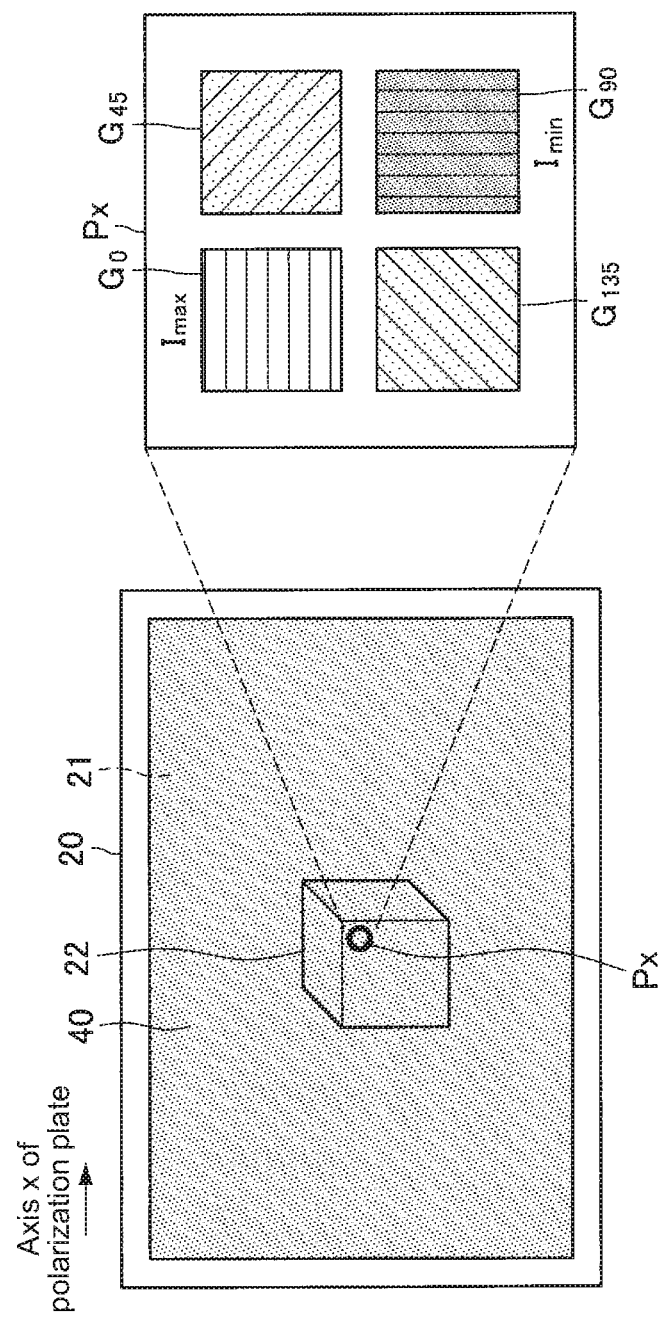
FIG. 4 A diagram for describing a case of capturing a region in which the polarization plate is present by use of the polarization camera.

Next, detailed functions of the information processing system 1A will be described. FIG. 4 is a diagram for describing a case of capturing a region in which the polarization plate is present by use of the polarization camera. Referring to FIG. 4, the polarization plate 40 having an x axis direction as a polarization direction is present in front of the display screen 21. That is, a region in which the polarization plate 40 having the x axis direction as the polarization direction is present is captured by the polarization camera 30.

At this time, the target region detected by the polarization camera 30 includes a region through which light polarized by the polarization plate 40 in the x axis direction passes. Therefore, it is conceivable that the luminance obtained on the basis of the polarization information in the polarization direction (x axis direction) becomes maximum, the luminance obtained on the basis of the polarization information in a direction perpendicular to the polarization direction (x axis direction) becomes minimum, and, in addition, a large difference is caused between the maximum luminance and the minimum luminance.

FIG. 4 shows the polarization information $G_0$, $G_{45}$, $G_{90}$, and $G_{135}$ obtained when the pixel Px is captured. Referring to FIG. 4, the luminance obtained from the polarization information $G_0$ in the polarization direction (x axis direction) is maximum (maximum luminance $I_{max}$) and the luminance obtained from the polarization information $G_{90}$ in a direction perpendicular to the polarization direction (x axis direction) is minimum (minimum luminance $I_{min}$). Then, it is understood that a large difference is caused between the luminance obtained from the polarization information $G_0$ (maximum luminance) and the luminance obtained from the polarization information $G_{90}$ (minimum luminance).

Figure 5:
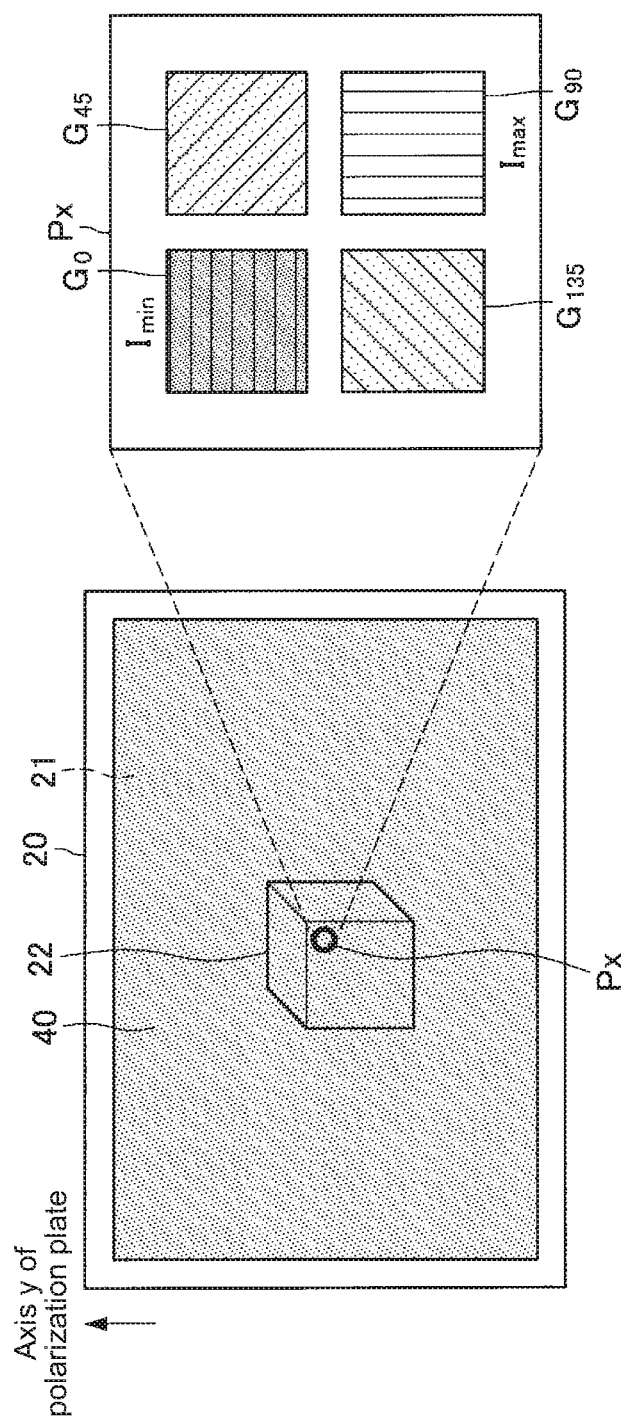
FIG. 5 A diagram for describing another case of capturing the region in which the polarization plate is present by use of the polarization camera.

FIG. 5 is a diagram for describing another case of capturing the region in which the polarization plate is present by use of the polarization camera. Referring to FIG. 5, the polarization plate 40 having a y axis direction as the polarization direction is present in front of the display screen 21. That is, a region in which the polarization plate 40 having the y axis direction as the polarization direction is present is captured by the polarization camera 30.

At this time, the target region detected by the polarization camera 30 includes the region through which light polarized by the polarization plate 40 in the y axis direction passes. Therefore, it is considered that a luminance obtained from the polarization information in the polarization direction (y axis direction) is maximum, the luminance obtained from the polarization information in the direction perpendicular to the polarization direction (y axis direction) is minimum, and, in addition, a large difference is caused between the maximum luminance and the minimum luminance.

FIG. 5 shows the polarization information $G_0$, $G_{45}$, $G_{90}$, and $G_{135}$ obtained when the pixel Px is captured. Referring to FIG. 5, the luminance obtained from the polarization information $G_{90}$ in the polarization direction (y axis direction) is maximum (maximum luminance $I_{max}$) and the luminance obtained from the polarization information $G_0$ in the direction perpendicular to the polarization direction (y axis direction) is minimum (minimum luminance $I_{min}$). Then, it is understood that a large difference is caused between the luminance obtained from the polarization information $G_{90}$ (maximum luminance) and the luminance obtained from the polarization information $G_0$ (minimum luminance).

As described above with reference to FIGS. 4 and 5, irrespective of which direction the polarization direction is, a large difference is caused between the maximum luminance $I_{max}$ and the minimum luminance $I_{min}$, in a case where the region in which the polarization plate 40 is present is captured by the polarization camera 30. On the other hand, in a case where the object is present in front of the polarization plate 40 and the region in which the object is present (hereinafter, also referred to as "object region") is captured by the polarization camera 30, it is considered that an excessively large difference is not caused between the maximum luminance and the minimum luminance as described above using FIG. 1.

In view of this, in the first embodiment, the object region is extracted by utilizing the degree of polarization calculated on the basis of the difference between the maximum luminance $I_{max}$ and the minimum luminance $I_{min}$. That is, in the information processing apparatus 10, the polarization information acquisition unit 112 acquires the polarization information $G_0$, $G_{45}$, $G_{90}$, and $G_{135}$. The degree-of-polarization calculation unit 113 calculates the degree of polarization on the basis of the polarization information $G_0$, $G_{45}$, $G_{90}$, and $G_{135}$. Then, the object region extraction unit 114 extracts the object region on the basis of the degree of polarization.

In accordance with such a configuration, the object region can be accurately extracted with a simpler configuration. More specifically, in accordance with the first embodiment, the object region can be extracted with a simpler configuration by using the only one polarization plate 40. Further, in accordance with the first embodiment, even if another object or region similar to an object whose region extraction is wished to be performed in terms of the quality of the material and/or the material is present, the object region can be accurately extracted by extracting the object region irrespective of the quality of the material and/or the material.

It should be noted that it is considered that it becomes easier for the difference between the maximum luminance $I_{max}$ and the minimum luminance $I_{min}$ to be stabilized as the number of directions in which the polarization information can be obtained is increased irrespective of a relationship between the polarization direction of the polarization plate 40 and the direction in which the polarization information is obtained the polarization camera 30.

On the other hand, it is considered that as the number of directions in which the polarization information is obtained is reduced, it becomes difficult for the difference between the maximum luminance $I_{max}$ and the minimum luminance $I_{min}$ to be stabilized. However, the relationship between the polarization direction of the polarization plate 40 and the direction in which the polarization information is obtained the polarization camera 30 can also be determined in advance in such a manner that the difference between the maximum luminance $I_{max}$ and the minimum luminance $I_{min}$ is easily stabilized as a measure against such a situation, for example.

Hereinafter, a case where the polarization information acquisition unit 112 acquires the polarization information $G_0$, $G_{45}$, $G_{90}$, and $G_{135}$ for each of the pixels will be mainly described. At this time, the degree-of-polarization calculation unit 113 calculates the degree of polarization for each of the pixels on the basis of the polarization information $G_0$, $G_{45}$, $G_{90}$, and $G_{135}$ for each of the pixels. Then, the object region extraction unit 114 extracts the object region on the basis of the degree of polarization for each of the pixels. However, the unit in which the polarization information $G_0$, $G_{45}$, $G_{90}$, and $G_{135}$ is acquired is not limited to each of the pixels and may be each of a predetermined-size blocks. It should be noted that how the polarization information $G_0$, $G_{45}$, $G_{90}$, and $G_{135}$ may be acquired. For example, the polarization information $G_0$, $G_{45}$, $G_{90}$, and $G_{135}$ may be acquired with respect to each pixel by being captured by a single polarization camera four times while rotating the polarization plate 40. Alternatively, in a case where the polarization plates different in the polarization direction are provided in front of each of the four polarization cameras, the polarization information $G_0$, $G_{45}$, $G_{90}$, and $G_{135}$ may be acquired with respect to each pixel by being respectively captured by the four polarization cameras. Alternatively, in a case where the polarization filter having any one polarization direction of four polarization directions (0 degrees, 45 degrees, 90 degrees, 135 degrees) in front of each pixel is provided, any one of pieces of polarization information of the polarization information $G_0$, $G_{45}$, $G_{90}$, and $G_{135}$ may be acquired with respect to each pixel by performing image capturing by the polarization camera.

Further, hereinafter, an example in which light is polarized by the polarization plate 40 will be mainly described. At this time, polarized light is generated in such a manner that the incident light upon the polarization plate 40 is polarized by the polarization plate 40. However, as will be also described later, light may be polarized by another substance instead of the polarization plate 40.

Further, the method for calculating the degree of polarization is also not limited. For example, the degree-of-polarization calculation unit 113 determines the maximum luminance Imax and the minimum luminance $I_{min}$ on the basis of the polarization information $G_0$, $G_{45}$, $G_{90}$, and $G_{135}$ and calculates the degree of polarization on the basis of the maximum luminance $I_{max}$ and the minimum luminance $I_{min}$. Hereinafter, an example in which the degree-of-polarization calculation unit 113 selects the maximum luminance $I_{max}$ and the minimum luminance $I_{min}$ on the basis of luminances obtained on the basis of the polarization information $G_0$, $G_{45}$, $G_{90}$, and $G_{135}$ will be mainly described. However, as will be described later, the maximum luminance $I_{max}$ and the minimum luminance $I_{min}$ may be determined in accordance with another method.

Further, hereinafter, a method of calculating, by the degree-of-polarization calculation unit 113, the degree of polarization on the basis of the difference between the maximum luminance $I_{max}$ and the minimum luminance $I_{min}$ will be mainly described. As an example, hereinafter, a method of calculating, by the degree-of-polarization calculation unit 113, the degree of polarization in accordance with P1 of (Expression 1) below will be mainly described.

[Expression 1]

$$P1 = \frac{I_{max} - I_{min}}{I_{max} + I_{min}} \quad \text{(Expression 1)}$$

For example, the object region extraction unit 114 extracts the object region on the basis of whether or not the degree of polarization exceeds the predetermined threshold. At this time, whether the region in which the degree of polarization exceeds the threshold should be extracted as the object region or should be extracted as the region in which the polarization plate 40 is present depends on how to calculate the degree of polarization.

For example, it is considered that the degree of polarization of the region in which the polarization plate 40 is present becomes larger than the degree of polarization of the object region in a case where the degree of polarization is calculated by P1 of (Expression 1). In view of this, the object region extraction unit 114 only needs to set a region in which the degree of polarization exceeds the threshold to the region in which the polarization plate 40 is present. That is, the object region extraction unit 114 only needs to extract a region in which the degree of polarization is below the threshold as the object region.

Figure 6:
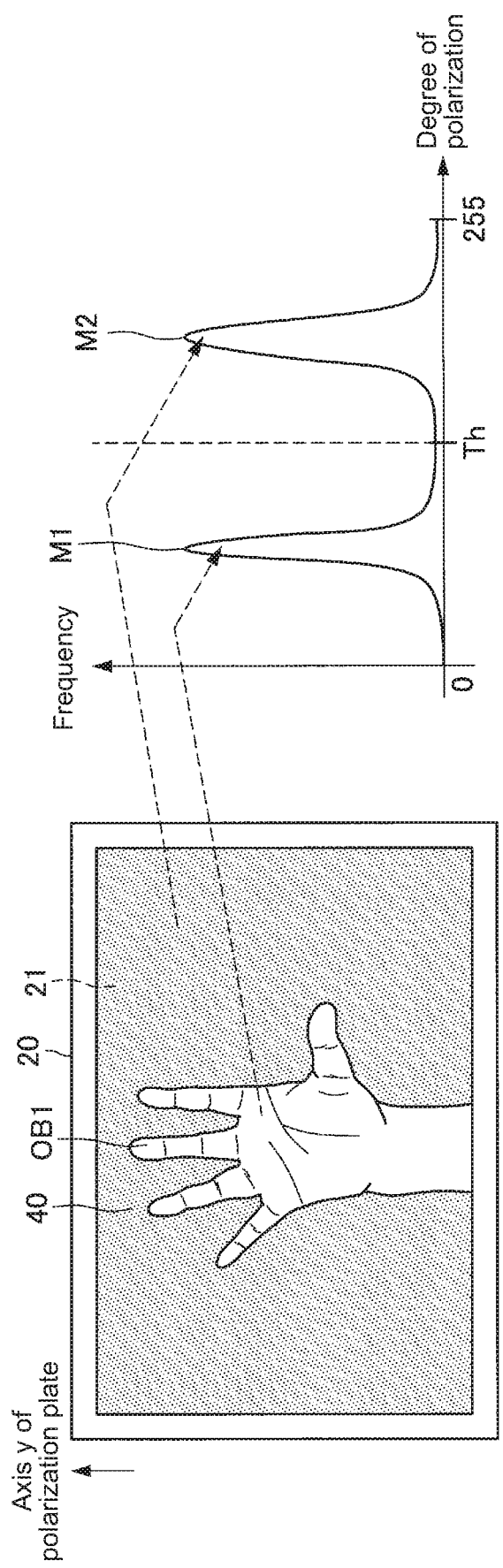
FIG. 6 A diagram for describing an example of a method for automatically determining a threshold to be compared to a degree of polarization.

The threshold to be compared to the degree of polarization may be determined in advance. Alternatively, the threshold to be compared to the degree of polarization may be automatically determined. For example, the object region extraction unit 114 may calculate the threshold on the basis of the frequency distribution of the degree of polarization. FIG. 6 is a diagram for describing an example of a method for automatically determining a threshold to be compared to the degree of polarization. As shown in FIG. 6, an object OB1 is present in front of the polarization plate 40. At this time, as shown in FIG. 6, it is assumed that the frequency distribution of the degree of polarization is obtained. Two peaks (a peak M1 and a peak M2) appear in the frequency distribution.

At this time, the object region extraction unit 114 only needs to determine any value between the two peaks (the peak M1 and the peak M2) which appears in the frequency distribution of the degree of polarization as a threshold Th. It should be noted that here, although a case where the threshold Th is determined on the basis of the degree of polarization which is obtained preceding the degree of polarization to be used for extraction of the object region is assumed, the timing at which the threshold Th is determined is not particularly limited. For example, the threshold Th may be determined preceding extraction of the object region on the basis of the degree of polarization to be used for extraction of the object region.

Figure 7:
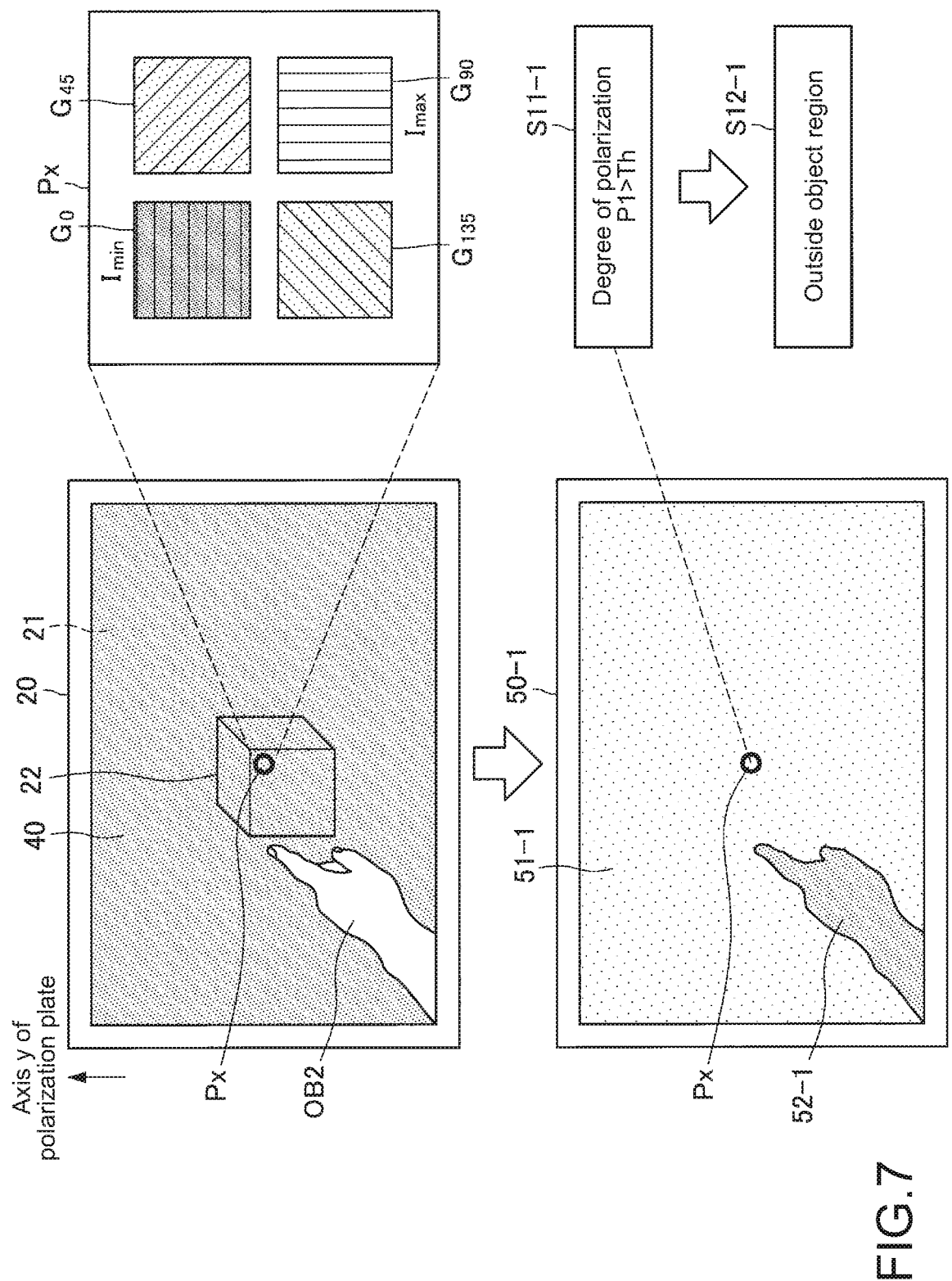
FIG. 7 A diagram for describing pixels at which an object region is absent.

The extraction of the object region will be described specifically. FIG. 7 is a diagram for describing the pixels at which the object region is absent. Referring to FIG. 7, an object OB2 is present in front of the polarization plate 40. Further, a degree-of-polarization image 50-1 shows the degree of polarization for each of the pixels and includes a degree of polarization 51-1 of the polarization plate region and a degree of polarization 52-1 of the object region (a region in which the object OB2 is present). It should be noted that in the degree-of-polarization image 50-1, the pixel having a higher degree of polarization is expressed to be brighter. Here, the object OB2 does not reach the pixel Px of the display object 22.

At this time, the object region extraction unit 114 determines that the degree of polarization P1 of the pixel Px is larger than the threshold (S11-1). Then, the object region extraction unit 114 determines that the pixel Px is outside the object region (S12-1). Therefore, the processing execution unit 115 does not select the display object 22.

Figure 8:
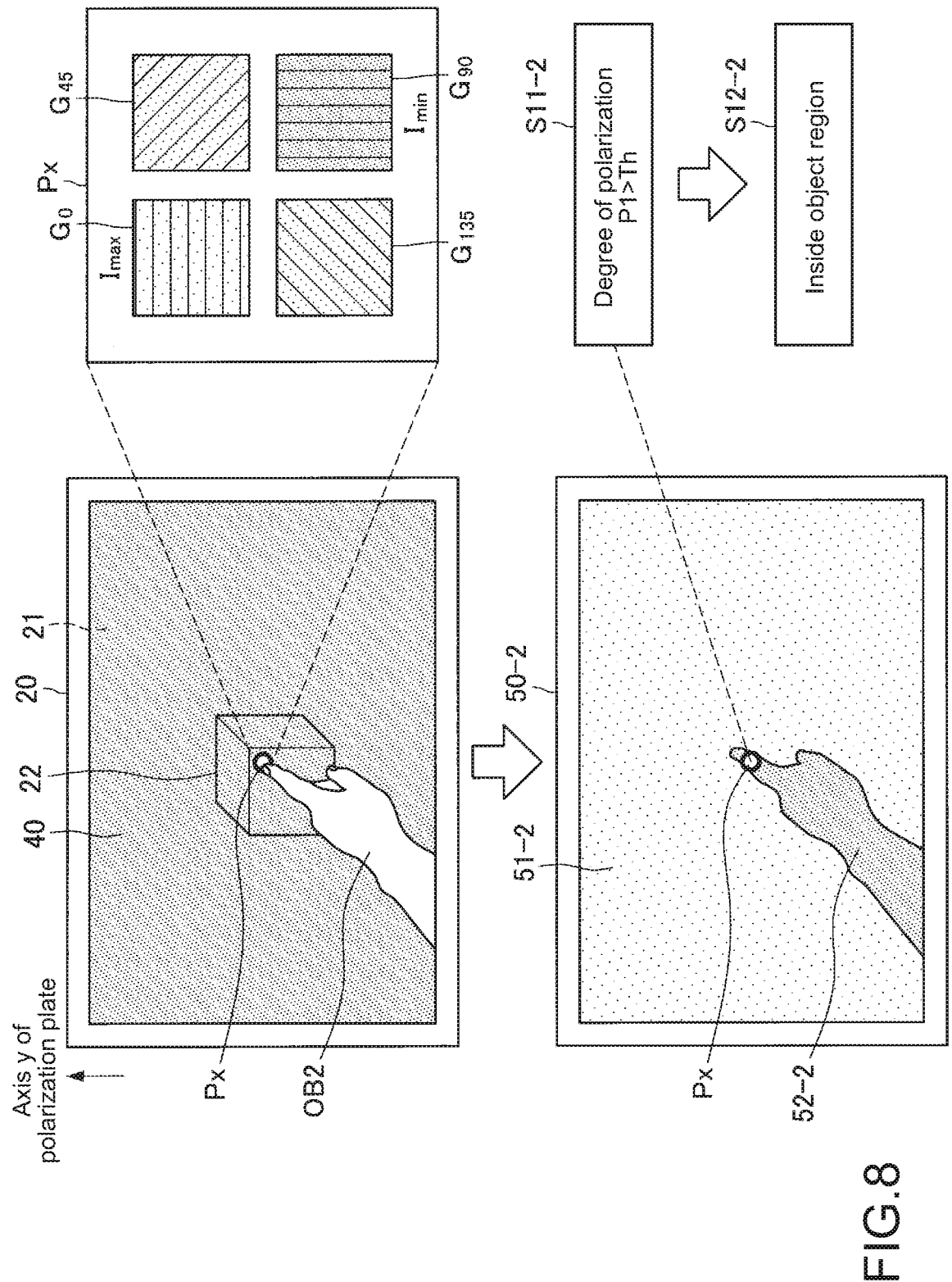
FIG. 8 A diagram for describing the pixels at which the object region is present.

FIG. 8 is a diagram for describing the pixels at which the object region is present. Referring to FIG. 8, a degree-of-polarization image 50-2 includes a degree of polarization 51-2 of the polarization plate region and a degree of polarization 52-2 of the object region (the region in which the object OB2 is present). The object OB2 reaches the pixel Px of the display object 22. At this time, the object region extraction unit 114 determines that the degree of polarization P1 of the pixel Px is smaller than the threshold Th (S11-2). Then, the object region extraction unit 114 determines that the pixel Px is inside the object region (S12-2). Therefore, the processing execution unit 115 selects the display object 22.

It should be noted that here, the example in which the extracted object OB2 is the hand has been described. However, in accordance with the first embodiment, the extracted object is not limited to the hand. That is, the object region extraction unit 114 is capable of extracting any types of object.

Hereinabove, the detailed functions of the information processing system 1A according to the first embodiment has been described.

1.4. Operation Example of Information Processing System

Figure 9:
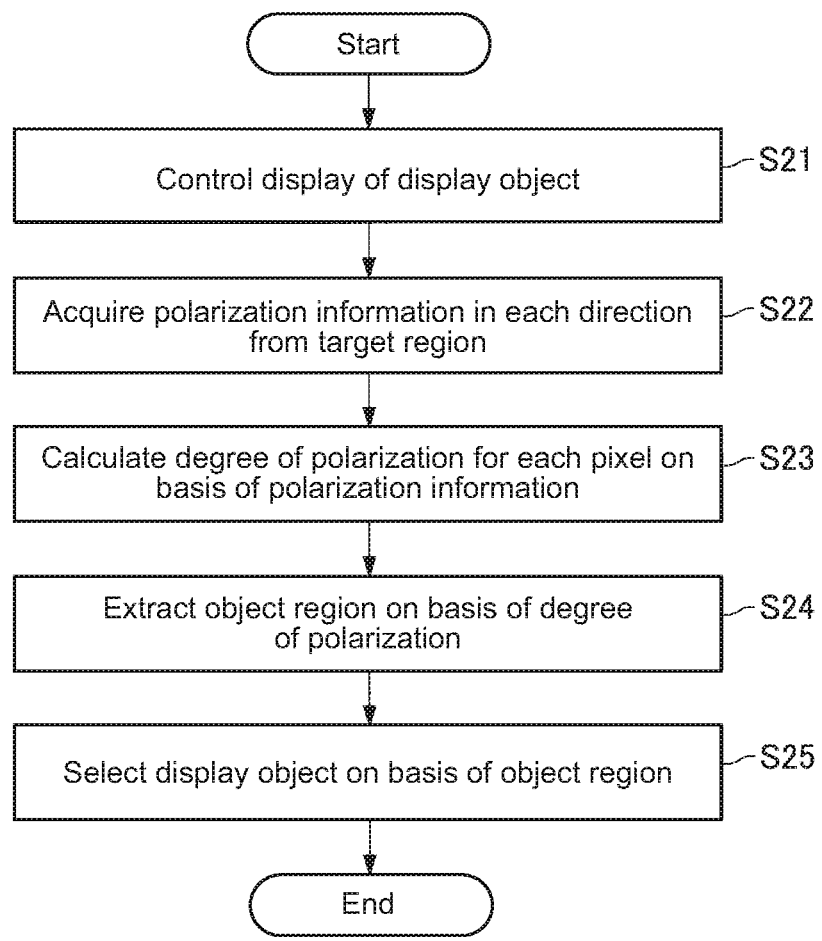
FIG. 9 A flowchart showing an operation example of an information processing system according to a first embodiment.

Next, an operation example of the information processing system 1A according to the first embodiment will be described. FIG. 9 is a flowchart showing an operation example of the information processing system 1A according to the first embodiment. It should be noted that the flowchart shown in FIG. 9 merely shows an example of an operation of the information processing system 1A. Therefore, the operation of the information processing system 1A is not limited to the operation example of the flowchart shown in FIG. 9.

As shown in FIG. 9, in the information processing apparatus 10, the processing execution unit 115 controls display of the display object 22 (S21). Subsequently, the polarization information acquisition unit 112 acquires, for each of the pixels, the polarization information in each direction from the target region detected by the polarization camera 30 (S22). The degree-of-polarization calculation unit 113 calculates the degree of polarization for each of the pixels on the basis of the polarization information for each of the pixels (S23). The object region extraction unit 114 extracts the object region on the basis of the degree of polarization for each of the pixels (S24). Then, the processing execution unit 115 selects the display object 22 on the basis of the object region (S25).

Hereinabove, the operation example of the information processing system 1A according to the first embodiment has been described.

1.5. VARIOUS MODIFIED EXAMPLES

Next, various modified examples according to the first embodiment will be described. Hereinabove, an example in which the degree-of-polarization calculation unit 113 selects the maximum luminance $I_{max}$ and the minimum luminance $I_{min}$ from the luminances obtained on the basis of the polarization information $G_0$, $G_{45}$, $G_{90}$, and $G_{135}$ has been mainly described. However, the maximum luminance $I_{max}$ and the minimum luminance $I_{min}$ may be determined in accordance with other methods.

For example, the degree-of-polarization calculation unit 113 may calculate the maximum luminance Imax and the minimum luminance $I_{min}$ by fitting the polarization information $G_0$, $G_{45}$, $G_{90}$, and $G_{135}$ to the predetermined function. Here, the function to which fitting is to be performed is not particularly limited. As an example, the function to which fitting is to be performed may be a cosine curve.

Figure 10:
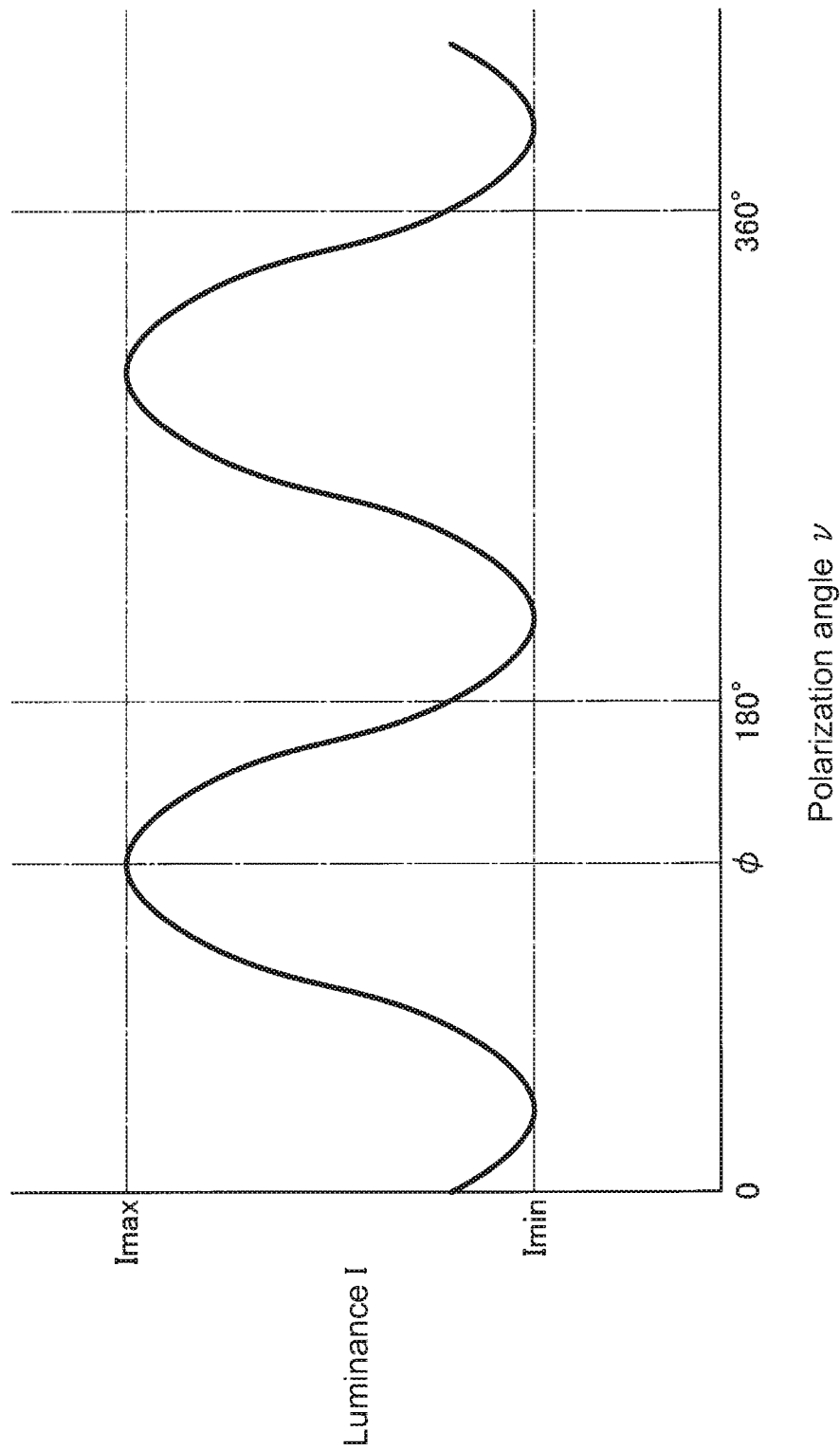
FIG. 10 A diagram showing an example of a function to which fitting of multiple pieces of polarization information is to be performed.

FIG. 10 is a diagram showing an example in which the function to which fitting of the polarization information $G_0$, $G_{45}$, $G_{90}$, and $G_{135}$ is to be performed. As shown in FIG. 10, the degree-of-polarization calculation unit 113 may determine a maximum value of the cosine curve which the polarization information $G_0$, $G_{45}$, $G_{90}$, and $G_{135}$ fits, as the maximum luminance $I_{max}$. Further, the degree-of-polarization calculation unit 113 may determine a minimum value of the cosine curve which the polarization information $G_0$, $G_{45}$, $G_{90}$, and $G_{135}$ fits, as the minimum luminance $I_{min}$. A more detailed fitting method has been disclosed by Patent Literature 1 above.

Further, hereinabove, an example in which the degree-of-polarization calculation unit 113 calculates a degree of polarization P1 has been mainly described. However, the degree-of-polarization calculation unit 113 may calculate a value other than the degree of polarization P1 instead of the degree of polarization P1. For example, the degree-of-polarization calculation unit 113 may calculate P2 of (Expression 2) below.

[Expression 2]

$$P2 = \frac{I_{max} + I_{min}}{I_{max} - I_{min}} \quad \text{(Expression 2)}$$

It should be noted that P2 of (Expression 2) has inverted denominator and numerator as compared to P1 of (Expression 1). That is, a magnitude relationship of P2 is inverted as compared to P1 of (Expression 1), and therefore it is considered that the region P2 in which the polarization plate 40 is present is smaller than P2 of the object region. In view of this, the object region extraction unit 114 only needs to extract a region in which P2 exceeds the threshold as the object region and set a region in which P2 is below the threshold as the region in which the polarization plate 40 is present.

Further, for example, the degree-of-polarization calculation unit 113 calculates P3 of (Expression 3) below.

[Expression 3]

$$P3 = \begin{cases} \frac{I_{max}}{I_{max}} (\text{if } I_{min} \neq 0) \\ \text{Maximum value (if } I_{min} = 0) \\ \text{which can be taken by } \frac{I_{max}}{I_{max}} \end{cases} \quad \text{(Expression 3)}$$

In this manner, the degree-of-polarization calculation unit 113 may calculate a value other than the degree of polarization P1 on the basis of a ratio of the maximum luminance $I_{max}$ to the minimum luminance $I_{min}$. It should be noted that the magnitude relationship of P3 is not inverted as compared to P1 of (Expression 1), and thus the object region extraction unit 114 only needs to set a region in which P3 exceeds the threshold as the region in which the polarization plate 40 is present and extract a region in which P3 is below the threshold as the object region. Further, although the example in which where $I_{min}$ is zero, the maximum value of $I_{max}/I_{min}$ is P3 has been shown, the value other than the maximum value of $I_{max}/I_{min}$ may be P3 where $I_{min}$ is zero. That is, P3 of the region in which the polarization plate 40 is present only needs to be set to be a highest value.

Further, for example, the degree-of-polarization calculation unit 113 may calculate P4 of (Expression 4) below.

[Expression 4]

$$P4 = \frac{I_{min}}{I_{max}} \quad \text{(Expression 4)}$$

It should be noted that the magnitude relationship of P4 is inverted as compared to P3 of (Expression 3), and thus the object region extraction unit 114 only needs to extract the region in which P4 exceeds the threshold as the object region and set the region in which P4 is below the threshold to the region in which the polarization plate 40 is present.

Further, for example, the degree-of-polarization calculation unit 113 may calculate P5 of (Expression 5) below.

[Expression 5]

$$P5 = \frac{I_{max} - I_{min}}{2} \quad \text{(Expression 5)}$$

It should be noted that the magnitude relationship of P5 is inverted as compared to P1 of (Expression 1), and thus the object region extraction unit 114 only needs to set a region in which P5 exceeds the threshold as the region in which the polarization plate 40 is present and extract a region in which P5 is below the threshold as the object region.

Further, for example, the degree-of-polarization calculation unit 113 may calculate P6 of (Expression 6) below.

[Expression 6]

$$P6 = I_{max} - I_{min} \quad \text{(Expression 6)}$$

It should be noted that the magnitude relationship of P6 is not inverted as compared to P1 of (Expression 1), and thus the object region extraction unit 114 may extract the region in which the polarization plate 40 is present as a region in which P6 exceeds the threshold and the region in which P6 is below the threshold as the object region.

Further, for example, the illumination light reflected by the polarization plate 40 is detected by the polarization camera 30. Therefore, there is a case where the maximum luminance Imax is closer to the minimum luminance $I_{min}$ and the degree of polarization greatly changes (in a case of using P1, there is a case where the degree of polarization becomes greatly smaller). In view of this, the object region extraction unit 114 may extract the object region by using other information in addition to the degree of polarization. With this configuration, the object region is more accurately extracted.

Various types of information are conceivable as the other information. As an example, the object region extraction unit 114 may extract the object region on the basis of the other polarization information detected from the target region in addition to the degree of polarization. At this time, the object region extraction unit 114 may exclude a region in which the other polarization information satisfies a predetermined condition from the object region.

Figure 11:
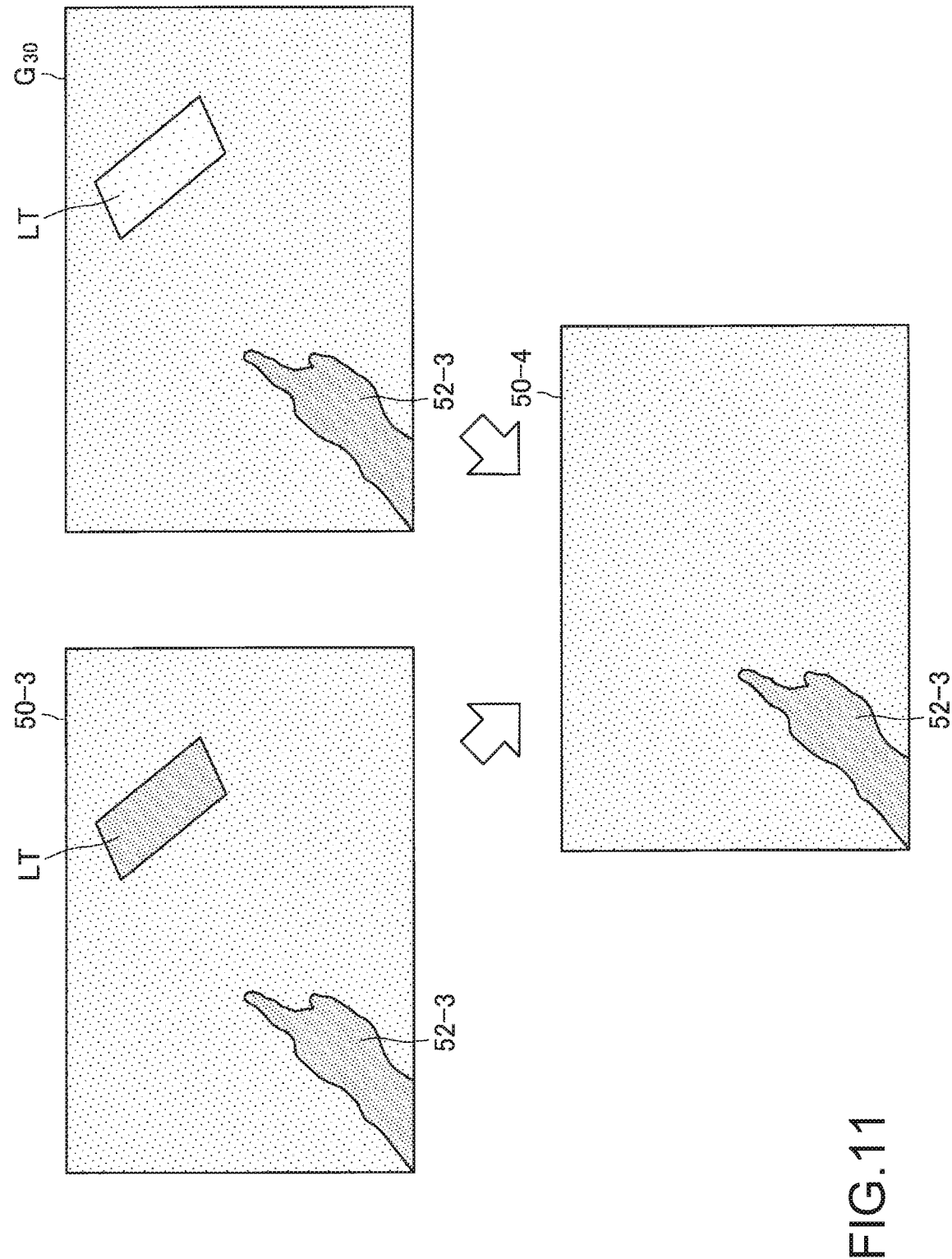
FIG. 11 A diagram for describing a case of also utilizing other polarization information for extraction of the object region.

FIG. 11 is a diagram for describing a case of also utilizing other polarization information for extraction of the object region. By referring to a degree-of-polarization image 50-3 in FIG. 11, the degree of polarization of a reflection region LT of the illumination light is lower than the threshold other than the degree of polarization of an object region 52-3. However, in polarization information G30, the luminance of the reflection region LT of the illumination light is higher. In view of this, the object region extraction unit 114 excludes a region in which the luminance is higher than a predetermined luminance (that is, the reflection region LT of the illumination light) in the polarization information G30 from the object region (the degree-of-polarization image 50-4), to thereby enable the extraction accuracy of the object region to be improved.

Further, as another example, the object region extraction unit 114 may extract the object region on the basis of the background image of the target region in addition to the degree of polarization. At this time, the object region extraction unit 114 may exclude the background region shown in the background image of the target region from object region. The background image may be obtained in such a manner that a median or multi-frequency is calculated for each of the pixels from a frame image in which the target region is captured in advance or the target region is successively captured. Image capturing of the background image may be captured by at least either one of the polarization camera 30 and another camera (e.g., gray camera and the like).

Figure 12:
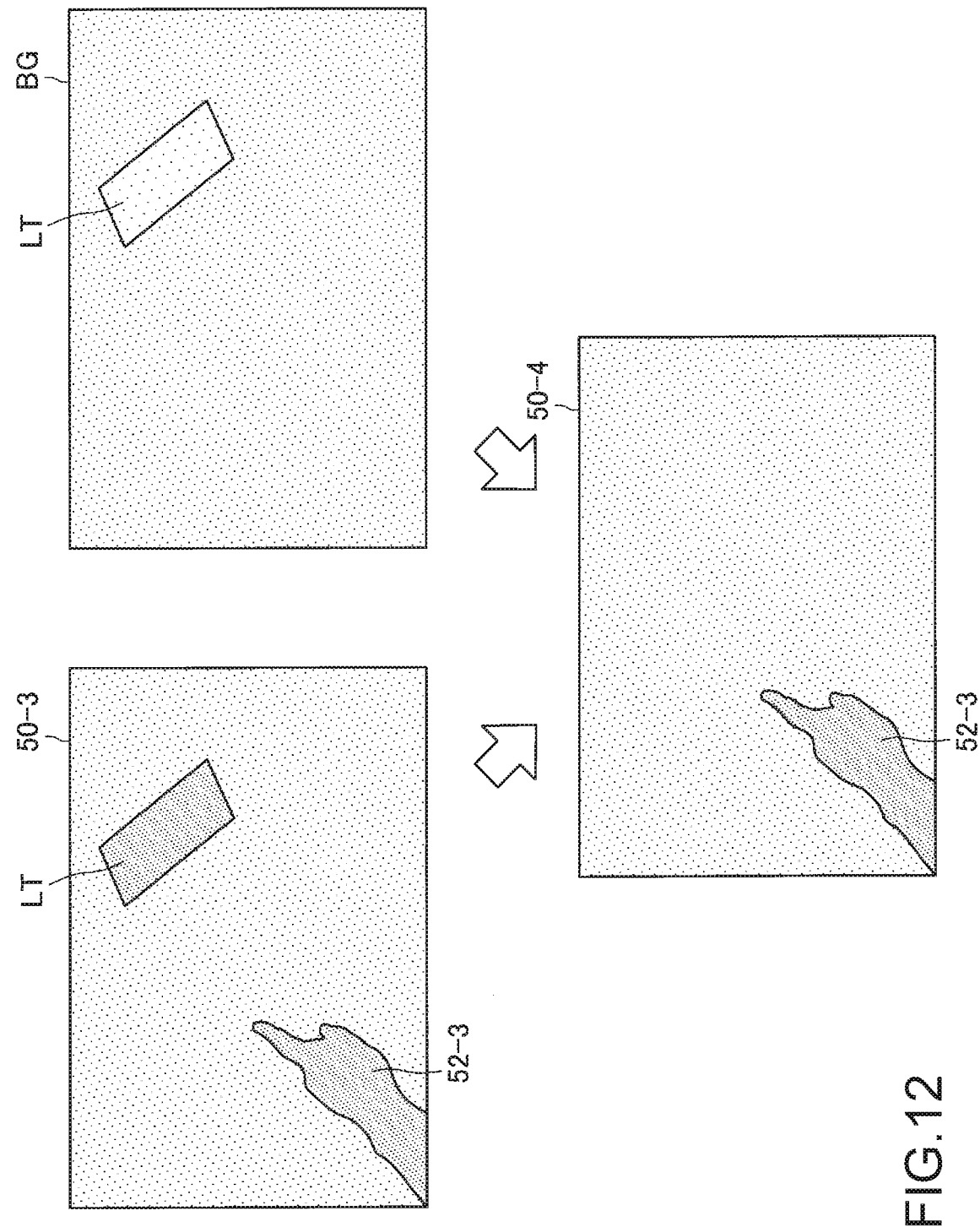
FIG. 12 A diagram for describing a case of also utilizing a background image for extraction of the object region.

FIG. 12 is a diagram for describing a case of also utilizing a background image for extraction of the object region. By referring to the degree-of-polarization image 50-3 in FIG. 12, the degree of polarization of the reflection region LT of the illumination light is lower than the threshold other than the degree of polarization of the object region 52-3. However, only the reflection region LT of the illumination light is shown in a background image BG. In view of this, the object region extraction unit 114 excludes the background region shown in the background image BG (that is, the reflection region LT of the illumination light) from the object region (the degree-of-polarization image 50-4), to thereby enable the extraction accuracy of the object region to be improved.

Further, as another example, the object region extraction unit 114 may extract the object region on the basis of the luminance of the target region in addition to the degree of polarization. At this time, the object region extraction unit 114 may exclude a region in which the luminance is higher than a predetermined first luminance or a region in which the luminance is lower than a predetermined second luminance from the object region.

Figure 13:
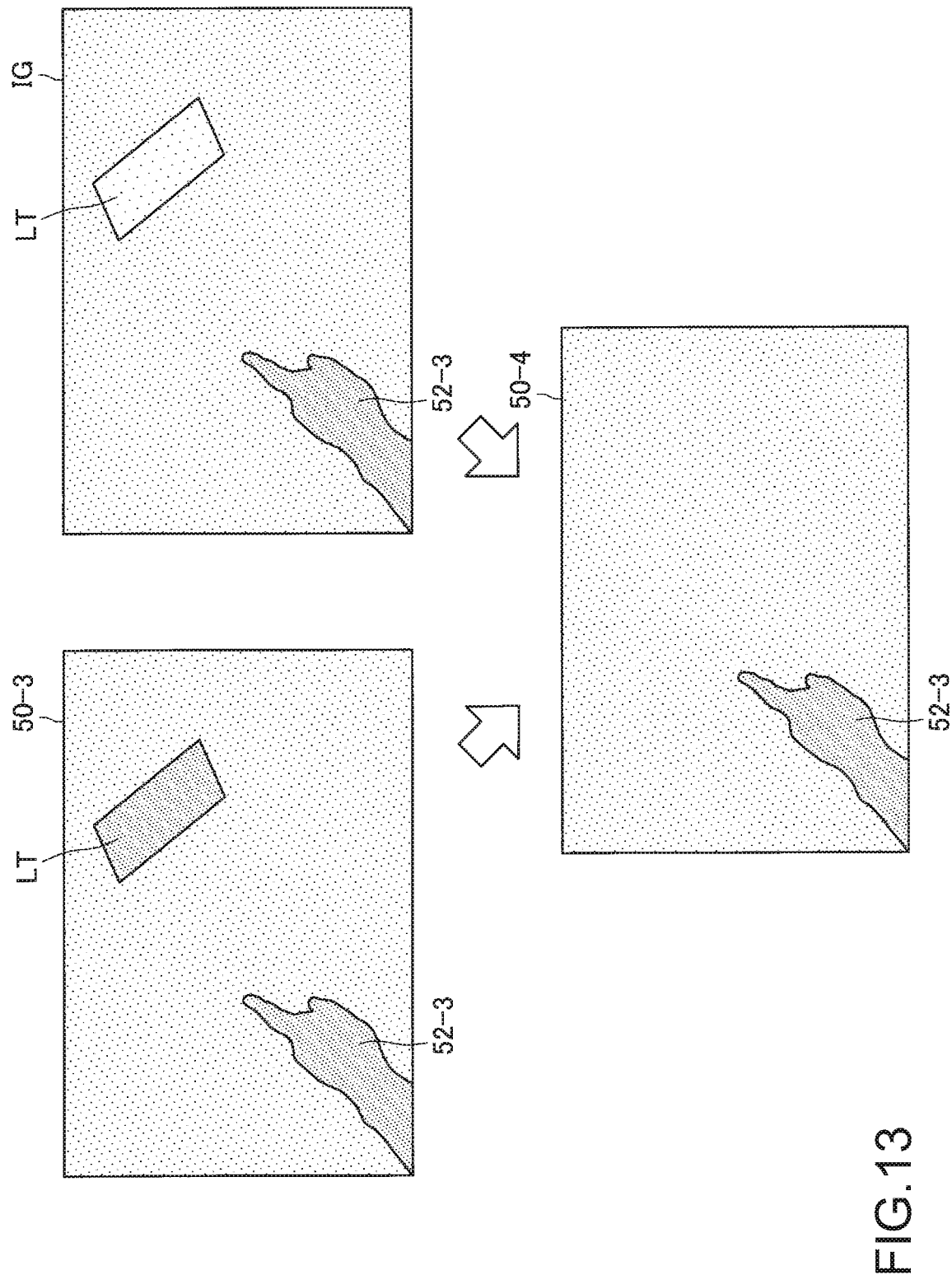
FIG. 13 A diagram for describing a case of also utilizing a luminance for extraction of the object region.

FIG. 13 is a diagram for describing a case of also utilizing a luminance for extraction of the object region. By referring to the degree-of-polarization image 50-3 of FIG. 13, the degree of polarization of the reflection region LT of the illumination light is lower than the threshold other than the degree of polarization of the object region 52-3. However, in a luminance image IG, only the luminance of the reflection region LT of the illumination light is higher than a predetermined luminance. In view of this, the object region extraction unit 114 excludes a region in which the luminance is higher than a predetermined luminance from the object region (the degree-of-polarization image 50-4), to thereby enable the extraction accuracy of the object region to be improved.

Hereinabove, the various modified examples according to the first embodiment have been described.

2. Second Embodiment

Next, a configuration example of the information processing system according to the second embodiment will be described. In the first embodiment, the example in which the polarized light is generated in such a manner that the incident light upon the polarization plate 40 is polarized by the polarization plate 40 has been described above. However, the polarized light may be generated by such a method. In the second embodiment, the example in which the polarized light is radiated by the polarization illumination device will be described.

Figure 14:
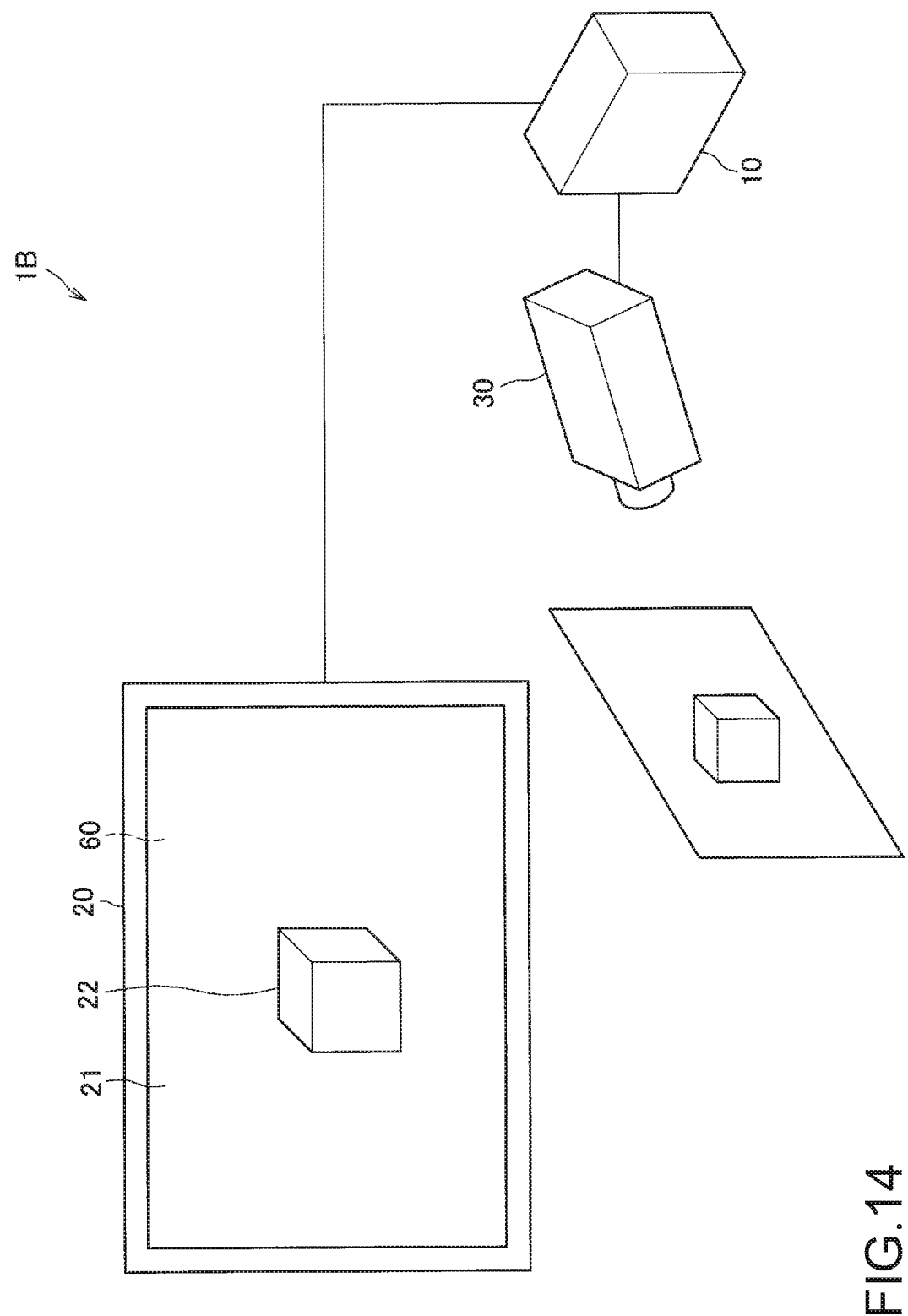
FIG. 14 A diagram showing a configuration example of an information processing system according to a second embodiment.

FIG. 14 is a diagram showing a configuration example of an information processing system 1B according to the second embodiment. Referring to FIG. 14, the target region of the polarization camera 30 is provided with a polarization illumination device 60. The light polarized by the polarization illumination device 60 is detected by the polarization camera 30. Therefore, the region in which the polarized light is detected by the polarization illumination device 60 can be handled in the same manner as the region in which the polarization plate 40 is present. It should be noted that the light polarized by the polarization illumination device 60 is reflected by a reflective plate, and is thus detected by the polarization camera 30.

Hereinabove, the second embodiment has been described.

3. Third Embodiment

Next, a configuration example of the information processing system according to the third embodiment will be described. In the first embodiment, the example in which the polarization plate 40 is provided in front of the display screen 21 has been described. Further, in the second embodiment, the example in which the polarization illumination device 60 is provided by the display screen 21 has been described. However, the position at which the polarization plate 40 or the polarization illumination device 60 is provided is not limited. In the third embodiment, the example in which the polarization plate 40 is provided on the wall will be described.

Figure 15:
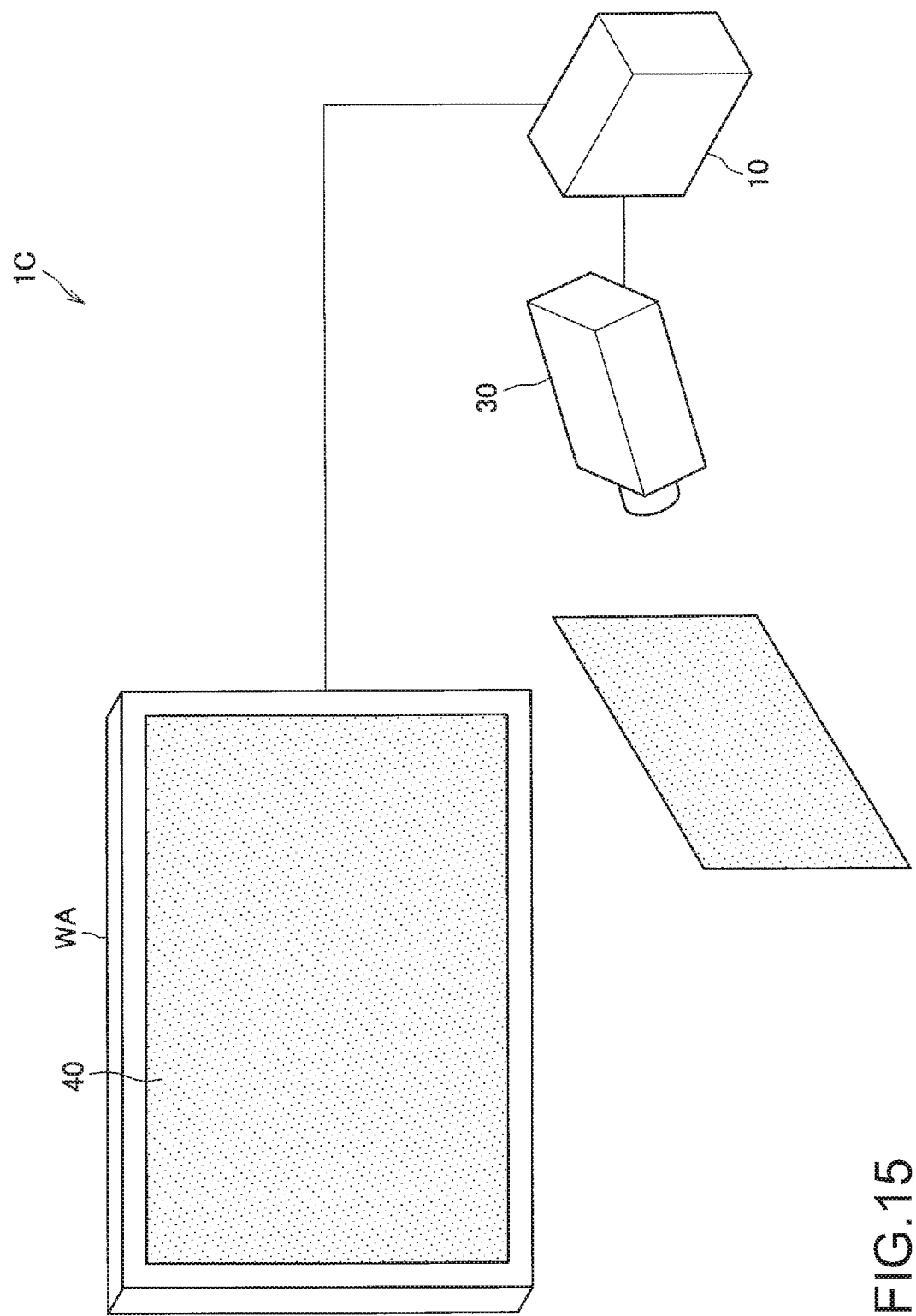
FIG. 15 A diagram showing a configuration example of an information processing system according to a third embodiment.

FIG. 15 is a diagram showing a configuration example of an information processing system 1C according to the third embodiment. Referring to FIG. 15, the polarization plate 40 is provided on a wall WA. Also in such a case, the object region can be extracted as in a case where the polarization plate 40 is provided on the display screen 21. It should be noted that the position at which the polarization camera 30 is provided is also not limited. For example, the polarization camera 30 may be provided in an eye-glasses type wearable terminal. Alternatively, the polarization camera 30 may be provided in an immersive terminal.

Hereinabove, the third embodiment has been described.

4. Hardware Configuration Example

Figure 16:
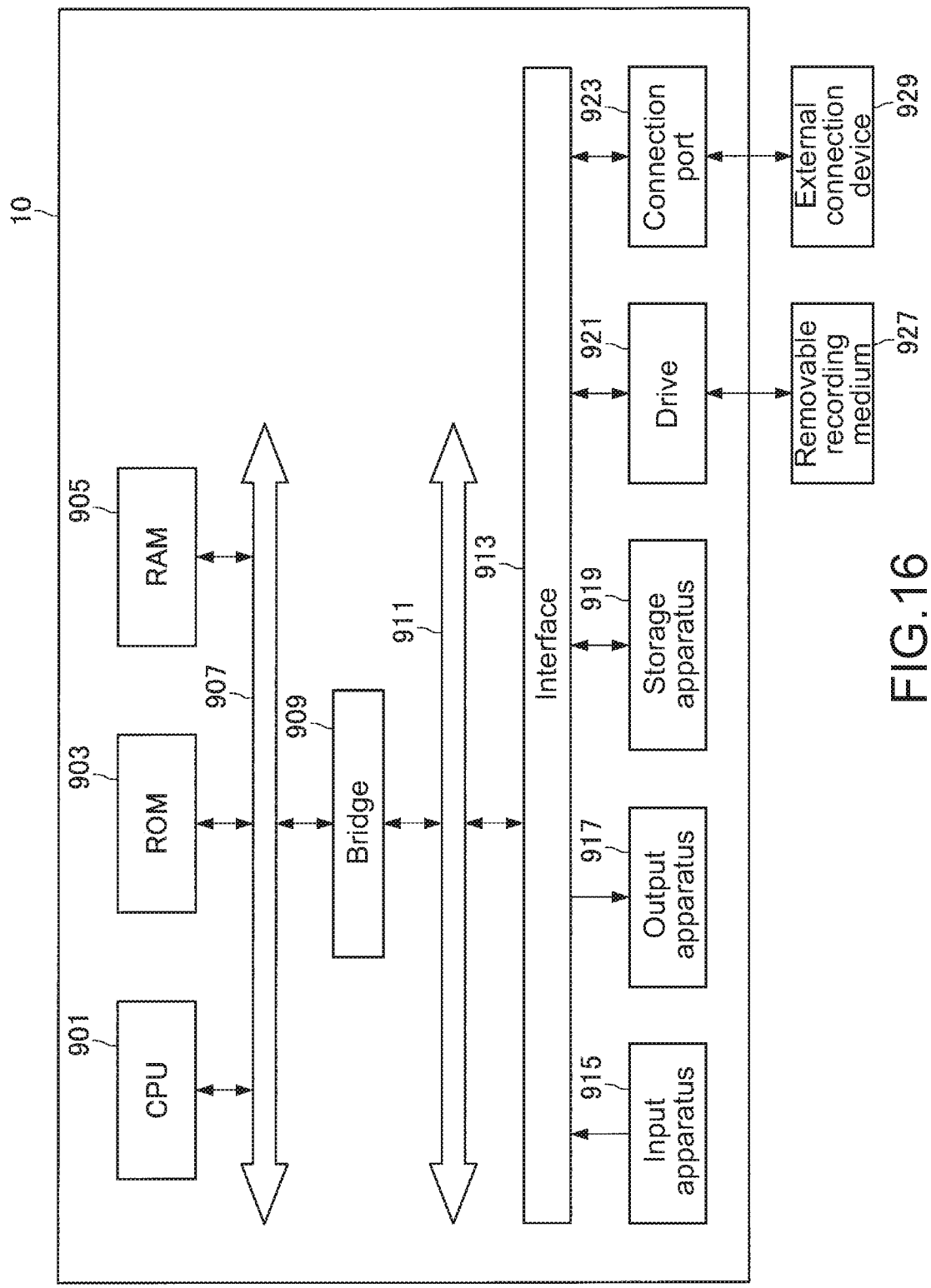
FIG. 16 A block diagram showing a hardware configuration example of the information processing apparatus according to the embodiment of the present disclosure.

Next, referring to FIG. 16, a hardware configuration of the information processing apparatus 10 according to the embodiment of the present disclosure will be described. FIG. 16 is a block diagram showing a hardware configuration example of the information processing apparatus 10 according to the embodiment of the present disclosure.

As shown in FIG. 16, the information processing apparatus 10 includes a central processing unit (CPU) 901, a read only memory (ROM) 903, and a random access memory (RAM) 905. The CPU 901, the ROM 903, and the RAM 905 can realize the control unit 110. Further, the information processing apparatus 10 may include a host bus 907, a bridge 909, an external bus 911, an interface 913, an input apparatus 915, an output apparatus 917, a storage apparatus 919, a drive 921, and a connection port 923. The information processing apparatus 10 may include a processing circuit as called digital signal processor (DSP) or application specific integrated circuit (ASIC) instead of the CPU 901 or in addition to this.

The CPU 901 functions as an arithmetic processing apparatus and a control apparatus and controls general operations in the information processing apparatus 10 or some of them in accordance with various programs recorded in the ROM 903, the RAM 905, the storage apparatus 919, or a removable recording medium 927. The ROM 903 stores a program, a computation parameter, and the like to be used by the CPU 901. The RAM 905 temporarily stores a program to be used in execution of the CPU 901, a parameter which changes as appropriate in that execution, and the like. The CPU 901, the ROM 903, and the RAM 905 are connected to one another by the host bus 907 including an internal bus such as a CPU bus. In addition, the host bus 907 is connected to the external bus 911 such as a peripheral component interconnect/interface (PCI) bus via the bridge 909.

The input apparatus 915 is an apparatus to be operated by the user, such as a button, for example. The input apparatus 915 may include a mouse, a keyboard, a touch panel, a switch, a lever, and the like. Further, the input apparatus 915 may include a microphone that detects user's voice. The input apparatus 915 may be a remote control device utilizing infrared rays and other radio waves, for example, or may be an external connection device 929 such as a cellular phone adapted for the operation of the information processing apparatus 10. The input apparatus 915 generates an input signal on the basis of information input by the user and includes an input control circuit that outputs the CPU 901. The user operates this input apparatus 915 to thereby input the various types of data into the information processing apparatus 10 and performs instruction to perform a processing operation.

The output apparatus 917 includes an apparatus capable of notifying the user of the acquired information visually or auditorily. The output apparatus 917 can be, for example, a display apparatus such as a liquid crystal display (LCD) and an organic electro-luminescence (EL) display, an audio output apparatus such as a speaker and a headphone, or the like. Further, the output apparatus 917 may include a plasma display panel (PDP), a projector, a hologram, a printer apparatus, and the like. The output apparatus 917 outputs a result obtained by the processing of the information processing apparatus 10 as video such as a text or an image and outputs it as sound such as voice or sound. Further, the output apparatus 917 may include a light for providing light. It should be noted that the output apparatus 917 can realize the above-mentioned output unit 160.

The storage apparatus 919 is an apparatus for data storage which is configured as an example of the storage unit of the information processing apparatus 10. The storage apparatus 919 includes, for example, a magnetic storage device such as a hard disk drive (HDD), a semiconductor storage device, a light storage device, a magneto-optical storage device, and the like. This storage apparatus 919 stores program and various types of data to be executed by the CPU 901, various types of data externally acquired, and the like.

The drive 921 is a reader/writer for a removable recording medium 927 including a magnetic disk, an optical disc, a magneto-optical disk, a semiconductor memory, and the like and is incorporated in or externally attached to the information processing apparatus 10. The drive 921 reads information recorded on the removable recording medium 927 attached thereto and outputs it to the RAM 905. Further, the drive 921 writes a record on the removable recording medium 927 attached thereto.

The connection port 923 is a port for directly connecting the device to the information processing apparatus 10. The connection port 923 can be, for example, a universal serial bus (USB) port, an IEEE1394 port, a small computer system interface (SCSI) port, and the like. Further, the connection port 923 may be an RS-232C port, a light audio terminal, a high-definition multimedia interface (HDMI (registered trademark)) port, or the like. By connecting the external connection device 929 to the connection port 923, the various types of data can be exchanged between the information processing apparatus 10 and the external connection device 929.

5. CONCLUSION

As described above, in accordance with the embodiment of the present disclosure, provided is the information processing apparatus 10 including the degree-of-polarization calculation unit 113 that calculates the degree of polarization on the basis of the polarization information in each of the multiple directions, which is detected from the target region including the region through which the polarized light passes, and the object region extraction unit 114 that extracts the region in which the object is present on the basis of the degree of polarization. By doing so, the region in which the object is present can be accurately extracted with a simpler configuration.

Hereinabove, the favorable embodiments of the present disclosure have been described in detail with reference to the accompanying drawings. However, a technical range of the present disclosure is not limited to such an example. It is obvious that various change examples or modification examples can be conceived by those with ordinary skill in the technical field of the present disclosure without departing from the scope of the technical idea described in the scope of claims. It should be understood that those also pertain to the technical range of the present disclosure as a matter of course.

Further, the technology according to the present disclosure can be applied to various scenes. For example, the technology according to the present disclosure can be applied to a case of generating a composite video on the basis of image capturing by a digital camera and a video camera. For example, in a case of generating a composite video for causing a television apparatus to perform display, a region in which a person is present can be extracted from a detection result of the polarization camera by installing the polarization plate at the background or irradiating a polarization illumination device with light from the background.

Further, for example, the technology according to the present disclosure can also be applied to scratch inspection of a glass and the like. Portions of a scratch and the like can be determined by utilizing the polarization camera by installing the polarization plate behind a substance that provides regular transmission, such as a glass, or irradiating the polarization illumination device with light from the back of a substance that provides regular transmission.

Further, for example, the technology according to the present disclosure can also be applied to defect inspection of the polarization plate and the polarization illumination device. Portions of a scratch and the like can be determined by inspecting the polarization plate with the polarization camera.

Further, for example, if the above-mentioned operation of the above-mentioned information processing apparatus 10 is realized, the positions of the respective units of the information processing apparatus 10 are not particularly limited. Some of processes of the respective units of the information processing apparatus 10 may be performed by a server (not shown) different from the information processing apparatus 10. As a specific example, some of or all of the respective blocks (the polarization information acquisition unit 112, the degree-of-polarization calculation unit 113, the object region extraction unit 114 and the processing execution unit 115) of the control unit 110 in the information processing apparatus 10 may be present in the server (not shown) or the like.

Further, the effects described in the present specification are merely illustrative or exemplary and are not limitative. That is, the technology according to the present disclosure can provide other effects apparent to those skilled in the art in light of the present specification in addition to the above-mentioned effects or instead of the above-mentioned effects.

It should be noted that the following configurations also pertain to the technical range of the present disclosure.

(1) An information processing apparatus, including
    one or more processors that
    calculate a degree of polarization on the basis of polarization information in each of multiple directions, which is detected from a target region including a region through which polarized light passes, and
    extract a region in which an object is present on the basis of the degree of polarization.

(2) The information processing apparatus according to (1), in which
the one or more processors calculate the degree of polarization for each of the pixels on the basis of polarization information for each of pixels in each of the multiple directions, and
the one or more processors extract the region in which the object is present on the basis of the degree of polarization for each of the pixels.

(3) The information processing apparatus according to (1) or (2), in which
the polarized light is generated in such a manner that incident light upon a polarization plate is polarized by the polarization plate.

(4) The information processing apparatus according to any one of (1) to (3), in which
the one or more processors determine a maximum luminance and a minimum luminance on the basis of the polarization information in each of the multiple directions and calculate the degree of polarization on the basis of the maximum luminance and the minimum luminance.

(5) The information processing apparatus according to (4), in which
the one or more processors select the maximum luminance and the minimum luminance from a luminance obtained on the basis of the polarization information in each of the multiple directions.

(6) The information processing apparatus according to (4), in which
the one or more processors calculate the maximum luminance and the minimum luminance by fitting the polarization information in each of the multiple directions to a predetermined function.
(7) The information processing apparatus according to any one of (4) to (6), in which
the one or more processors calculate the degree of polarization on the basis of a difference or a ratio between the maximum luminance and the minimum luminance.
(8) The information processing apparatus according to any one of (1) to (7), in which
the one or more processors extract the region in which the object is present on the basis of whether or not the degree of polarization exceeds a predetermined threshold.
(9) The information processing apparatus according to (8), in which
the one or more processors calculate the threshold on the basis of a frequency distribution of the degree of polarization.
(10) The information processing apparatus according to (9), in which
the one or more processors determine any value between two peaks which appear in the frequency distribution of the degree of polarization as the threshold.
(11) The information processing apparatus according to any one of (1) to (10), in which
the one or more processors extract the region in which the object is present on the basis of other polarization information detected from the target region and the degree of polarization.
(12) The information processing apparatus according to (11), in which
the one or more processors exclude a region in which the other polarization information satisfies a predetermined condition from the region in which the object is present.
(13) The information processing apparatus according to any one of (1) to (10), in which
the one or more processors extract the region in which the object is present on the basis of a background image of the target region and the degree of polarization.
(14) The information processing apparatus according to (13), in which
the one or more processors exclude a background region shown in the background image of the target region from the region in which the object is present.
(15) The information processing apparatus according to (14), in which
the background image is obtained in such a manner that a median or multi-frequency is calculated for each of the pixels from a frame image in which the target region is captured in advance or the target region is successively captured.
(16) The information processing apparatus according to any one of (1) to (15), in which
the one or more processors extract the region in which the object is present on the basis of a luminance of the target region and the degree of polarization.
(17) The information processing apparatus according to (16), in which
the one or more processors exclude a region in which the luminance is higher than a predetermined first luminance or a region in which the luminance is lower than a predetermined second luminance from the region in which the object is present.
(18) The information processing apparatus according to (1) or (2), in which
the polarized light is radiated by a polarization illumination device.
(19) An information processing method, including:
calculating a degree of polarization on the basis of polarization information in each of multiple directions, which is detected from a target region including a region through which polarized light passes; and
extracting, by one or more processors, a region in which an object is present on the basis of the degree of polarization.
(20) A recording medium readable by a computer, which records a program for causing the computer to function as an information processing apparatus including
one or more processors that
calculate a degree of polarization on the basis of polarization information in each of multiple directions, which is detected from a target region including a region through which polarized light passes, and
extract a region in which an object is present on the basis of the degree of polarization.

REFERENCE SIGNS LIST 1 (1A, 1B, 1C) information processing system
10 information processing apparatus
110 control unit
112 polarization information acquisition unit
113 degree-of-polarization calculation unit
114 object region extraction unit
115 processing execution unit
130 storage unit
150 storage unit
160 output unit
20 display apparatus
21 display screen
22 display object
30 polarization camera
40 polarization plate
50 degree-of-polarization image
60 polarization illumination device

The invention claimed is:

1. An information processing apparatus, comprising:
a plurality of processors configured to:
calculate a degree of polarization based on first polarization information in each direction of a plurality of directions, wherein the first polarization information is detected from a target region through which polarized light passes;
calculate a threshold value based on frequency distribution of the degree of polarization; and
extract a first region in which an object is present, wherein
the extraction of the first region is based on the degree of polarization, and
the degree of polarization exceeds the threshold value.

2. The information processing apparatus according to claim 1, wherein the plurality of processors is further configured to:
calculate the degree of polarization for each pixel of a plurality of pixels based on a basis of the first polarization information in each direction of the plurality of directions, wherein the first polarization information is associated with each pixel of the plurality of pixels; and
extract the first region based on the degree of polarization for each pixel of the plurality of pixels.

3. The information processing apparatus according to claim 1, wherein the polarized light is generated by a polarization plate based on light incident on the polarization plate.

4. The information processing apparatus according to claim 1, wherein the plurality of processors is further configured to:
determine each of a maximum luminance and a minimum luminance based on the first polarization information in each direction of the multiple plurality of directions; and
calculate the degree of polarization based on a basis of the maximum luminance and the minimum luminance.

5. The information processing apparatus according to claim 4, wherein the plurality of processors is further configured to:
obtain luminance based on the first polarization information in each direction of the plurality of directions; and
select each of the maximum luminance and the minimum luminance from the obtained luminance.

6. The information processing apparatus according to claim 4, wherein the plurality of processors is further configured to:
fit the first polarization information in each direction of the plurality of directions to a function; and
calculate each of the maximum luminance and the minimum luminance based on the fitting of the first polarization information.

7. The information processing apparatus according to claim 4, wherein the plurality of processors is further configured to calculate the degree of polarization based on one of a difference between the maximum luminance and the minimum luminance or a ratio between the maximum luminance and the minimum luminance.

8. The information processing apparatus according to claim 1, wherein the plurality of processors is further configured to determine a value between two peaks in the frequency distribution of the degree of polarization as the threshold value.

9. The information processing apparatus according to claim 1, wherein
the plurality of processors is further configured to extract the first region based on second polarization information and the degree of polarization, and
the second polarization information is detected from the target region.

10. The information processing apparatus according to claim 9, wherein
the plurality of processors is further configured to exclude a second region from the first region, and
the second polarization information satisfies a condition in the second region.

11. The information processing apparatus according to claim 1, wherein
the plurality of processors is further configured to extract the first region based on each of a background image of the target region and the degree of polarization.

12. The information processing apparatus according to claim 11, wherein
the plurality of processors is further configured to exclude a background region from the first region, and
the background region is in the background image of the target region.

13. The information processing apparatus according to claim 12, wherein
the plurality of processors is further configured to:
calculate one of a median or multi-frequency for each pixel of a plurality of pixels from a frame image; and
obtain the background image based on one of the median or the multi-frequency, and
in the frame image, the target region is captured in advance or the target region is successively captured.

14. The information processing apparatus according to claim 1, wherein the plurality of processors is further configured to extract the first region based on each of a first luminance of the target region and the degree of polarization.

15. The information processing apparatus according to claim 14, wherein
the plurality of processors is further configured to exclude one of a second region or a third region from the first region,
the first luminance is higher than a second luminance in the second region, and
the first luminance is lower than a third luminance in the third region.

16. The information processing apparatus according to claim 1, wherein the polarized light is radiated by a polarization illumination device.

17. An information processing method, comprising:
calculating, by a plurality of processors, a degree of polarization based on polarization information in each direction of a plurality of directions, wherein the polarization information is detected from a target region through which polarized light passes;
calculating, by the plurality of processors, a threshold value based on frequency distribution of the degree of polarization; and
extracting, by the plurality of processors, a region in which an object is present, wherein
the extraction of the region is based on a basis of the degree of polarization, and
the degree of polarization exceeds the threshold value.

18. A non-transitory computer-readable medium having stored thereon, computer-executable instructions which, when executed by a plurality of processors, cause the plurality of processors to execute operations, the operations comprising:
calculating a degree of polarization based on polarization information in each direction of a plurality of directions, wherein the polarization information is detected from a target region through which polarized light passes;
calculating a threshold value based on frequency distribution of the degree of polarization; and
extracting a region in which an object is present, wherein
the extraction of the region is based on the degree of polarization, and
the degree of polarization exceeds the threshold value.

* * * * *